United States Patent [19]

Payne

[11] Patent Number: 4,634,843
[45] Date of Patent: Jan. 6, 1987

[54] DUAL MODE POWER CONTROL ARRANGEMENT FOR COOKING APPLIANCE

[75] Inventor: Thomas R. Payne, Louisville, Ky.

[73] Assignee: General Electric Company, Louisville, Ky.

[21] Appl. No.: 819,388

[22] Filed: Jan. 16, 1986

[51] Int. Cl.$^4$ ............................................. H05B 1/02
[52] U.S. Cl. .................................... 219/486; 219/446; 219/448; 219/449; 219/452; 219/483; 219/506; 307/39
[58] Field of Search ............... 219/505, 506, 501, 464, 219/483–486, 451, 452, 441, 442, 453, 448, 449, 413, 490, 494, 497, 480; 307/38–41

[56] References Cited

U.S. PATENT DOCUMENTS

| | | | |
|---|---|---|---|
| 2,785,266 | 3/1957 | Lewis et al. | 219/209 |
| 4,158,127 | 6/1979 | Husslein | 219/446 |
| 4,431,907 | 2/1984 | Barnett . | |
| 4,493,979 | 1/1985 | Bredel et al. | 219/452 |
| 4,493,980 | 1/1985 | Payne et al. | 219/450 |

Primary Examiner—M. H. Paschall
Attorney, Agent, or Firm—H. Neil Houser; Radford M. Reams

[57] ABSTRACT

A power control arrangement particularly applicable to a multiple surface unit cooking appliance providing a griddle heated by the combination of a standard surface unit and an automatic surface unit. Temperature information for the standard surface unit is provided by a counter implemented in the controller which is incremented and decremented at rates which cause the count to approximately track the griddle temperature proximate the surface unit. In the griddle mode, the electronic controller operates the automatic surface unit at a power level established as a function of the user selected temperature setting and the sensed utensil temperature; and operates the standard surface unit at a power level established as a function of the power level established for the automatic surface unit, the selected setting, the sensed utensil temperature and the count of the counter, to overdrive the standard unit when it is relatively cool and the automatic unit is relatively hot and to underdrive the standard unit when it is relatively hot and the automatic surface unit is relatively cool to provide even heating of the griddle.

12 Claims, 19 Drawing Figures

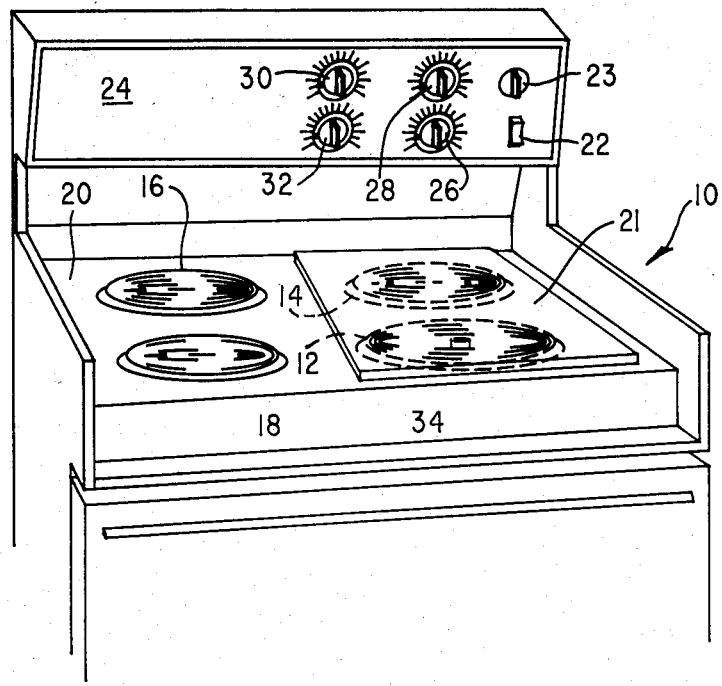
FIG.1
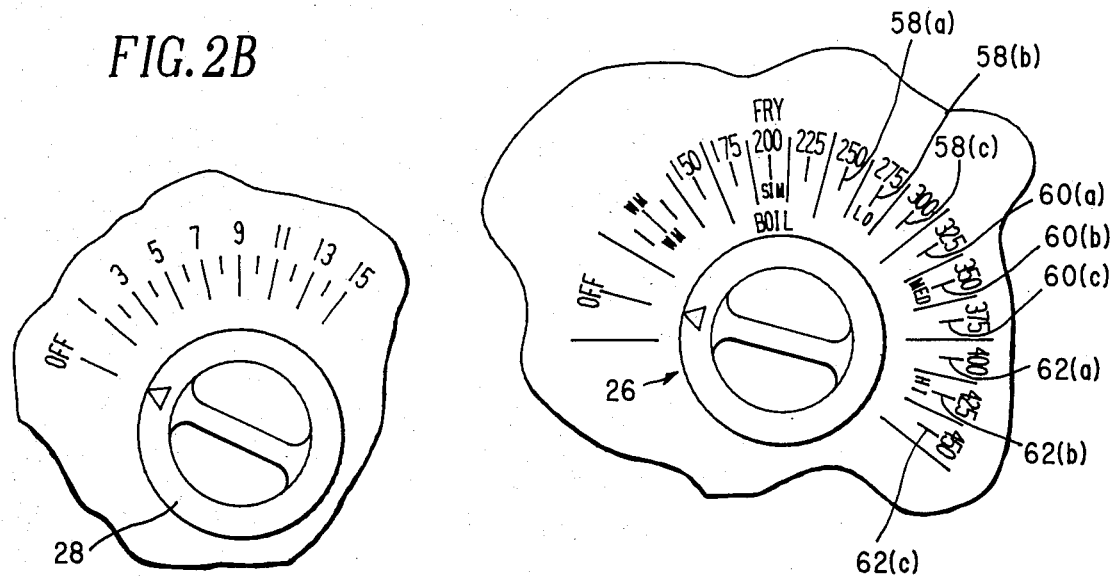
FIG.2A
FIG.2B
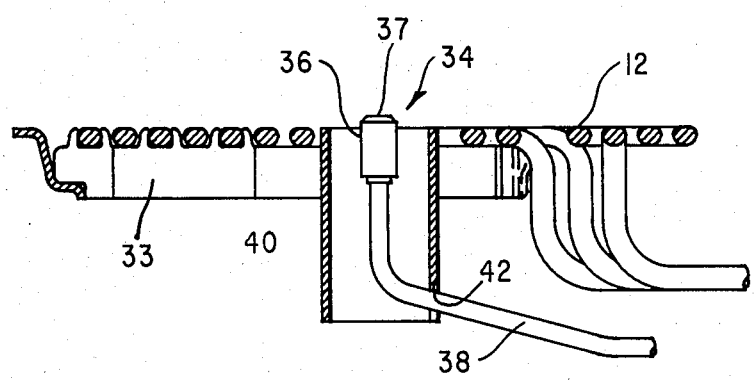
FIG.3A

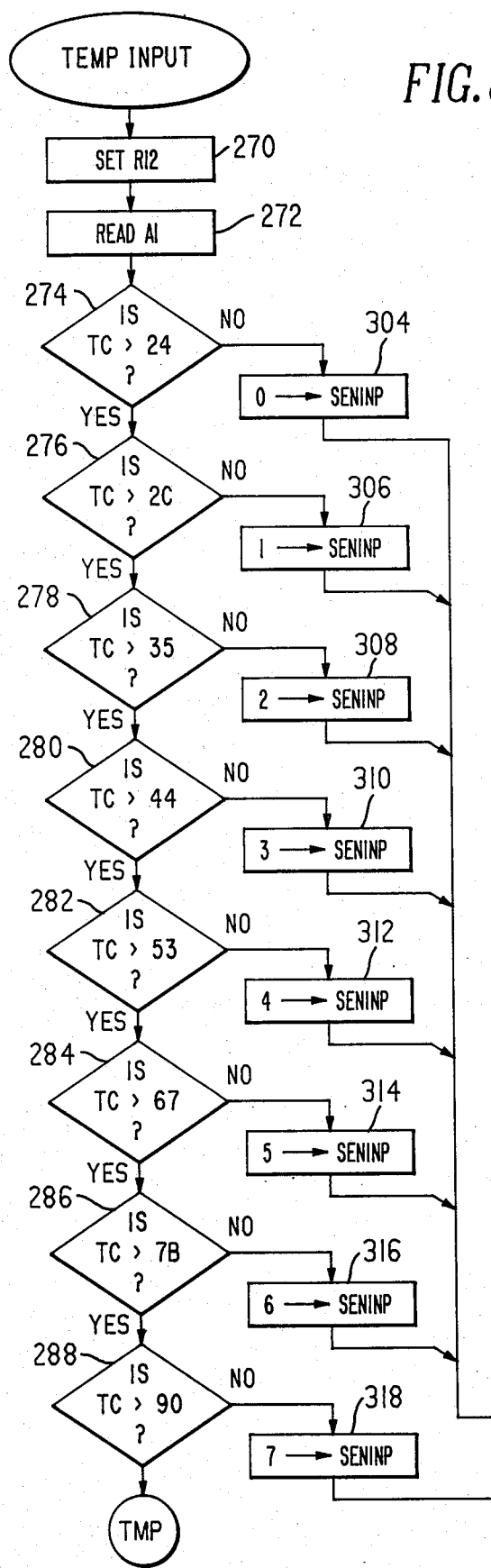
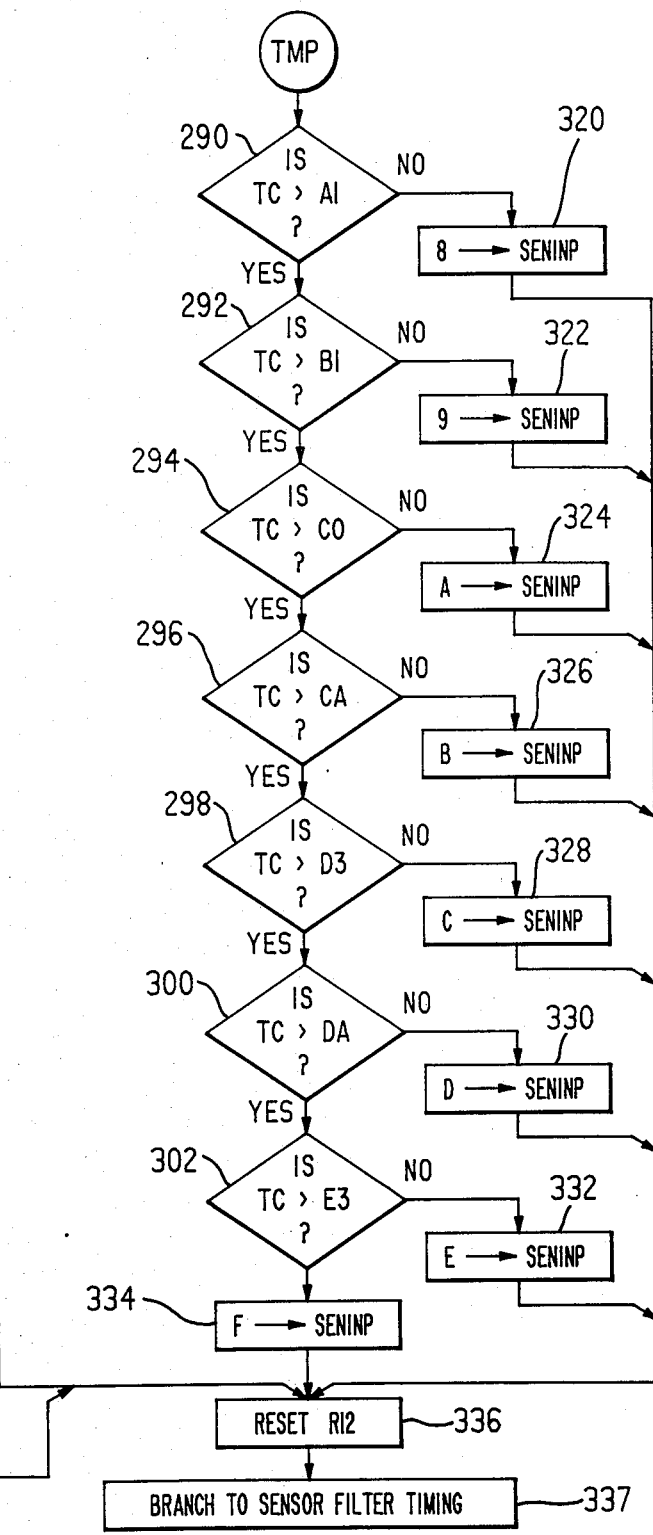
FIG. 8

DUAL MODE POWER CONTROL ARRANGEMENT FOR COOKING APPLIANCE

BACKGROUND OF THE INVENTION

This invention relates generally to a power control arrangement for surface heating units in a cooking appliance such as a domestic range, and more particularly to an arrangement for controlling surface units operated in a dual mode to jointly heat a utensil such as a griddle.

Electric ranges are now commercially available providing a griddle feature. Typically, in such ranges four surface units are clustered in a generally rectangular arrangement on the cooktop. Three of the surface units are standard surface units and one is an automatic surface unit, for which power is controlled as a function of the temperature of the utensil being heated thereon. Often the automatic surface unit employs a higher wattage rated resistive heating element than the other three units. To operate the range in the griddle mode, a griddle is supported on and extends over the automatic surface unit and one of the adjacent standard surface units. In order to provide temperature control during griddle operation, the energization of both surface units utilized in the griddle mode is influenced by the utensil temperature sensed by the automatic surface unit sensor. One arrangement for such control is disclosed in commonly assigned U.S. Pat. No. 2,785,266 to Lewis et al. In that arrangement, the energization of the automatic surface unit is controlled by an electromechanical thermostatic switch which periodically opens and closes in accordance with the selected temperature and the sensed utensil temperature. Insertion of the griddle in position on the cooktop alters the energization circuit of the standard surface unit such that it is energized and de-energized simultaneously with the automatic surface unit.

While this arrangement works satisfactorily when both surface units have the same wattage rating, when different wattage units are switched on and off simultaneously, the griddle is heated unevenly. Another disadvantage of this arrangement is that if the automatic surface unit is already hot from previous usage when the griddle mode is initiated, but the standard unit is at room temperature, even if both units are the same wattage rating, the standard unit will heat up relatively slowly since the on times, which are determined by the sensed utensil temperature, will be relatively short due to the preheating of the unit. In such instances the griddle will be unevenly heated for an extended warm up time. Similarly, if the standard unit is pre-heated from prior use, and the automatic surface unit is not, the standard unit may be overdriven while the automatic surface is heating up resulting in a portion of the griddle surface being overheated.

Commonly assigned U.S. Pat. No. 4,493,980 discloses an improved power control arrangement for automatic surface units which replaces the electromechanical power control arrangement with an electronic control circuit. The improved power control circuit provides for more rapid temperature response and tighter temperature control. However, similar shortcomings to those discussed above may be experienced with this system as well when operating in a griddle mode.

A power control arrangement for a range featuring a griddle mode which rapidly brings the griddle to the desired temperature and which provides relatively even heating of the griddle by both surface units regardless of relative wattage rating and regardless of initial conditions would be highly desirable.

It is therefore an object of the present invention to provide for a cooking appliance of the type featuring at least two surface units, an automatic surface unit and a standard surface unit, one of which has a relatively higher wattage rating, a power control arrangement which automatically compensates for the wattage difference to provide even heating by both surface units, as a function of the temperature sensed by the automatic surface unit when operating in a griddle mode.

It is a further object of the present invention to provide for a cooking appliance having a griddle heated by two surface units, one of which is an automatic surface unit, which units may have the same or different wattage ratings, a power control arrangement in which the standard surface unit is overdriven when the automatic surface unit is relatively hot and the standard unit is relatively cool, and underdriven when the standard unit is relatively hot and the automatic surface unit is relatively cool to quickly bring the two units to approximately the same heating level for even heating of the griddle.

SUMMARY OF THE INVENTION

The present invention provides improved power control apparatus and methods for a cooking appliance having at least two surface units, one of which is an automatic surface unit and one of which is a standard surface unit and which provides a dual operating mode in which a griddle or other utensil extends over and is supported and heated both by the automatic surface unit and the standard surface unit.

The automatic surface unit includes a temperature sensor for sensing the temperature of the utensil being heated thereon. User operable input selector means enables the user to select the desired temperature setting for the automatic surface unit, to select the desired heat setting for the standard surface unit and to select the dual operating mode. When the dual mode is selected, the user selects the desired dual mode temperature by selecting the temperature for the automatic surface unit.

Electronic control means controls energization of both surface units in response to the user input selector means and the temperature sensing means. The control means is operative in the normal operating mode to apply a power level to the automatic surface unit which is established as a function of the sensed utensil temperature and the selected temperature, and to independently apply a power level to the standard surface unit corresponding to the user selected heat setting for that surface unit. In response to selection of the dual mode, the control means applies a power level to the automatic surface unit established as a function of the sensed utensil temperature and the selected temperature and applies a power level to the standard surface unit established as a function of the power level applied to the automatic surface unit to provide relatively even heating of the griddle or other utensil.

In accordance with one form of the invention, particularly applicable to a cooking appliance in which the two surface units have substantially different wattage ratings, the power level applied to the standard surface unit in the dual mode is established by the control means as a function of the power level applied to the automatic surface unit, which function is selected to compensate for the difference in wattage ratings whereby the effective heating levels of the respective surface units are approximately the same.

In accordance with another aspect of the invention, the electronic control means further includes heater energy counter means, incremented and decremented at rates approximately proportional to the rate of change of temperature of the surface unit for the applied power level for approximately tracking the temperature of the griddle or other utensil proximate the standard surface unit. The approximate temperature information provided by the heater energy counter for the standard surface unit is used in combination with the sensed temperature information obtained for the automatic surface unit to rapidly bring both surface units to approximately equal heating levels in the dual mode regardless of the prevailing initial conditions.

In accordance with this latter aspect of the invention the power control means is operative in the dual mode to operate the automatic surface unit at a power level established as a function of the selected temperature and the sensed utensil temperature, and to operate the standard surface unit at a power level established as a function of the power level established for the automatic surface unit, the sensed utensil temperature, and the count of the heater energy counter, to overdrive the standard surface unit when the standard unit is relatively cool and the automatic surface unit is relatively hot and underdrive the standard surface unit when the standard surface unit is relatively hot and the automatic surface unit is relatively cool, as indicated by the count of the heater energy counter and sensed utensil temperature respectively.

While the novel features of the invention are set forth with particularity in the appended claims, the invention, both as to organization and content will be better understood and appreciated from the following detailed description taken in conjunction with the drawings.

BRIEF DESCRIPTION OF THE DRAWINGS

FIG. 1 is a front perspective view of a portion of an electric range illustratively embodying the power control arrangement of the present invention;

FIGS. 2A and 2B are greatly enlarged views of a portion of the control panel of the range of FIG. 1 showing the details of an automatic surface unit control knob and a regular surface unit control knob respectively;

FIG. 3A is a sectional side view of the automatic surface unit incorporated in the range of FIG. 1 showing the temperature sensor;

FIG. 8 is a flow diagram of the TEMP INPUT routine incorporated in the control program for the microprocessor in the circuit of FIG. 5;

DETAILED DESCRIPTION OF THE ILLUSTRATIVE EMBODIMENT

Figure 3B:
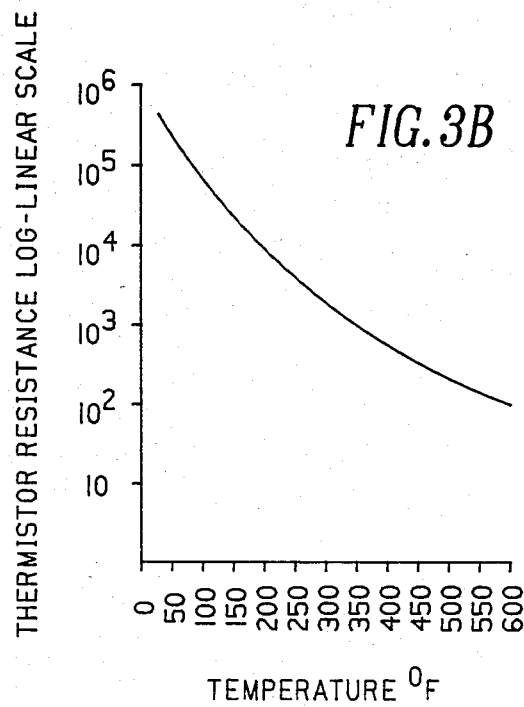
FIG. 3B is a graphic representation of the resistance versus temperature characteristic for the temperature sensor of FIG. 3A.

FIG. 1 illustrates an electric range 10 incorporating a control arrangement illustratively embodying the present invention. Range 10 includes four conventional electric surface units comprising resistive heating ements 12, 14, 16 and 18 supported from a substantially horizontal support surface 20.

Heating element 12 is a so-called "three-in-one" element comprising three concentric elements selectively connectible in parallel combinations as will be hereinafter described in greater detail. Elements 14–18 comprise sing e resistive elements. Each of elements 12–18 are adapted to support cooking utensils, such as frying pans, sauce pans, tea kettles, etc., placed thereon for heating. In addition, a utensil in the form of a metallic griddle 21 is provided which is adapted to rest on and be heated by elements 12 and 14. Griddle 21, which is shown in FIG. 1 positioned for operation in a dual operating mode hereinafter referred to as the Griddle mode, is removable allowing the user the option of using elements 12 and 14 separately as independent surface units or cooperatively to heat griddle 21.

Heating element 12 is arranged to function as an automatic surface unit, that is, energization of element 12 is automatically controlled in accordance with a closed loop power control strategy as a function of the sensed temperature of the utensil being heated thereon and the user selected heat setting. Heating elements 14 (when operating independently), 16 and 18 are arranged to be duty cycle controlled in accordance with an open loop control strategy to provide a predetermined output power level corresponding to the user selected heat setting. As will be hereinafter described in detail, the control arrangement of the present invention provides a dual operating mode in which elements 12 and 14 are operated cooperatively to heat a utensil which extends over both elements, such as griddle 21. In this dual mode, which in the illustrative embodiment is the griddle mode, element 12 functions as an automatic surface unit and energization of element 14 is controlled as a function of the energization of element 12 to establish and maintain relatively even heating of griddle 21.

While, as is common practice, the range of the illustrative embodiment is provided with only one automatic surface unit, it will be appreciated that multiple automatic surface units could be provided.

Mode selection switch 22 on control panel 24 enables the user to select the Fry Mode or the general Boil Mode for heating element 12. Griddle selection knob 23 on panel 24 enables the user to select the Griddle Mode and to select the desired parallel connections for element 12 when operating in other than the Griddle Mode. Manually operable rotary control knobs 26, 28, 30 and 32 are mounted to control panel 24. Control knobs 26 and 28 are illustrated in greater detail in FIGS. 2A and 2B respectively. Control knob 26 enables the user to select a plurality of heat settings corresponding to various cooking temperatures for the Fry Mode, and to select Warm, Simmer and Lo, Med and Hi Boil Modes for the general Boil mode. In the Boil mode the user may select from a plurality of heat settings within these modes as well. Knob 28 and knobs 30 and 32 which are identical to knob 28 enable the user to select the desired one of power levels 1-15 for heating elements 14, 16 and 18, respectively.

The utensil temperature sensing arrangement employed with the automatic surface unit in the illustrative embodiment will now be described with reference to FIG. 3A. Surface unit heating element 12 is supported on spider arms 33. The temperature sensor apparatus designated generally 34 includes a housing 36 mounted on one end of an elongated, generally L-shaped tubular arm 38.

A cylindrical shield 40 of low thermal mass metal forms the central core to which the radial spider arms 33 are attached and also serves to shield sensor housing 36 from radiated heat from heating element 12. Arm 38 extends through a slot 42 in shield 40, and bears against the upper end of the slot to hold housing 36 in the proper position slightly above the element 12 so as to cause the uppermost surface 37 of housing 36 to resiliently contact the bottom of a cooking utensil when it is placed on heating element 12. The temperature sensitive element (not shown) of the sensor contained within housing 36 is a conventional negative temperature coefficient thermistor having a resistance vs. temperature characteristic as shown in FIG. 3B. The structural details of this sensor arrangement do not form any part of the subject invention and are thus described only to the extent necessary for an understanding of the present invention. Such devices are described in greater detail in commonly assigned U.S. Pat. No. 4,241,289, the disclosure of which is hereby incorporated by reference.

Figure 4:
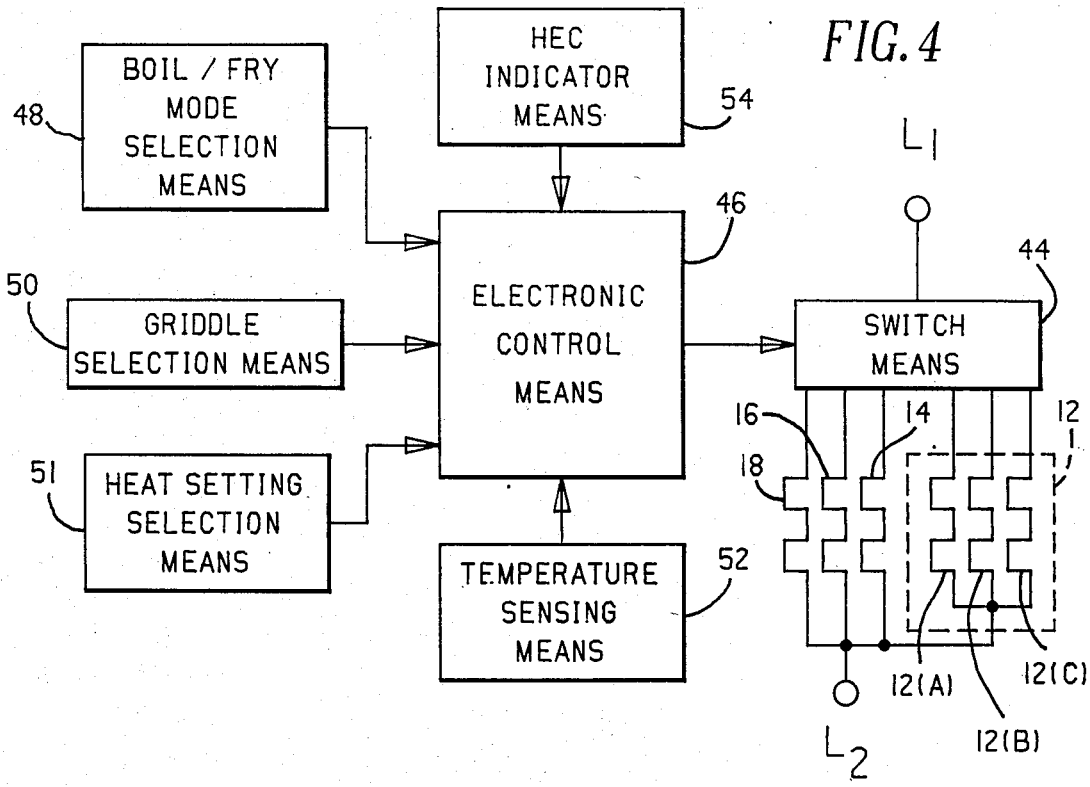
FIG. 4 is a greatly simplified functional block diagram of the control arrangement employed in the range of FIG. 1 illustratively embodying the power control arrangement of the present invention.

A generalized functional block diagram of the control arrangement for heating elements 12-18 of range IO is shown in FIG. 4. The three concentric elements comprising element 12 are illustrated schematically and designated 12(a)-12(c). Heating elements 12-18 are energized by a standard 60 Hz AC power signal which can be either 120 or 240 volts supplied to terminals L1 and L2. Power to elements 12-18 is controlled by switch means 44 comprising a separate switching device for each of elements 12-18. An additional switching device (not shown in FIG. 4) controlled by knob 23 determines which parallel combination of elements 12(a)-12(c) will be energized when element 12 is switched into conduction. The switching devices of switch means 44 are switched into and out of conduction by control signals generated by electronic control means 46.

Electronic control means 46 generates power control signals for element 12 in response to inputs from the user operable input selection means 48, 50 and 51 signifying mode and heat setting selections and inputs from temperature sensing means 52 which senses the temperature of the utensil being heated by element 12. Power control signals for element 14 when operating independently, and elements 16 and 18 are generated in response only to the heat setting selections via selection means 51. When in the Griddle mode element 14 is controlled in concert with element 12 in a manner to be hereinafter described.

In the illustrative embodiment, electronic control means 46 controls the output power level of each of heating elements 12-18 by controlling the duty cycle, i.e., the percentage of time power is applied to each heating element. A predetermined control period comprising a fixed number of control intervals is employed as the time base for power control. The ratio of conductive control intervals to the total number of control intervals in the control period, expressed as a percentage, is hereinafter referred to as the duty cycle. Preferably each control interval comprises eight full cycles of the standard 60 Hz 240 volt AC power signal corresponding to a time period of approximately 133 milliseconds. Each control period comprises 32 control intervals corresponding to a time period of approximately 4 seconds. The duration for the control interval and control period selected provide a satisfactory range of heat settings for desired cooking performance and can be programmed to make efficient use of microprocessor memory. It is understood, however, that control intervals and control periods of greater and lesser duration could be similarly employed.

TABLE I

| Power Level | % On Time | On Control Intervals Per Control Period | Hex Rep M(KB) | Count Per Energized Control Interval | Count Per Control Period | Max HEC Count |
|---|---|---|---|---|---|---|
| OFF | 0 | 0 | 0 | | | |
| 1 | 3 | 1 | 1 | 5⅓ | 5⅓ | 4096 |
| 2 | 6.5 | 2 | 2 | 5⅓ | 10⅔ | 4096 |
| 3 | 9 | 3 | 3 | 5⅓ | 16 | 4096 |
| 4 | 12.5 | 4 | 4 | 4 | 16 | 5120 |
| 5 | 16 | 5 | 5 | 4 | 20 | 5120 |
| 6 | 22 | 7 | 6 | 4 | 28 | 5120 |
| 7 | 25 | 8 | 7 | 2⅔ | 17⅓ | 6144 |
| 8 | 31.5 | 10 | 8 | 2⅔ | 16⅔ | 6144 |
| 9 | 37.5 | 12 | 9 | 2⅔ | 32 | 6144 |
| 10 | 44 | 14 | A | 2⅔ | 37⅓ | 6144 |
| 11 | 50 | 16 | B | 2 | 32 | 8192 |
| 12 | 62.5 | 20 | C | 2 | 40 | 8192 |
| 13 | 75 | 24 | D | 2 | 48 | 8192 |
| 14 | 87.5 | 28 | E | 2 | 56 | 8192 |
| 15 | 100 | 32 | F | 2 | 64 | 8192 |

Electronic control means 46 selectively implements one of sixteen different duty cycle power levels, including a zero duty cycle or OFF level. Table I shows the percentage ON time, i.e. the duty cycle and the number of conductive control intervals per control period for the available power levels.

Element 12 operates as an automatic surface unit. For use as a single surface the user may select either the Fry or Boil mode by manipulation of mode switch 22. For operation of surface unit 12 in tandem with unit 14 in the Griddle mode the user selects the Fry mode via switch 22 and the Griddle mode by manipulation of griddle knob 23. Since the present invention relates to the griddle mode of operation only the Fry mode for surface unit 12 is described herein. A suitable Boil mode is described and claimed in commonly assigned U.S. Pat. No. 4,493,980 which is hereby incorporated by reference.

Considering first the Fry mode, which is implemented for element 12 when operating singly or in tandem with element 14 for griddle use, this mode is intended to rapily bring the temperature of the utensil to the selected relatively narrow operating temperature range while avoiding extensive temperature overshoots and undershoots which can adversely affect cooking performance.

To facilitate rapid thermal response to an increase in heat setting, either from OFF or from a previously selected heat setting, heating element 12 is operated at a transient power level determined by the electronic control means as a function of the difference between the steady state temperature range and the sensed utensil temperature when the sensed utensil temperature is less than the steady state temperature range for the selected heat setting. As this temperature difference approaches zero, the applied power level approaches the steady state level.

For steady state operation each Fry Mode heat setting has associated with it a steady state duty cycle or power level which is intended to maintain typically loaded cooking utensils within the corresponding steady state temperature range following the transient heat-up period. When the sensed utensil temperature exceeds the steady state temperature range the heating element is de-energized. If the sensed utensil temperature decreases below the steady state temperature range, the power level applied to the heating element is again adjusted upwardly as a function of the temperature difference except that once the steady state range has been reached, the upward adjustment as a function of the temperature difference is at least twice as great as the adjustment made during the heat-up phase, so as to rapidly return the sensed utensil temperature to its steady state range.

TABLE II

| Hexadecimal Representation of Setting (KB) | Fry Mode | | |
|---|---|---|---|
| | Selected Heat Setting | Steady State Utensil Temp. Range °F. | Steady State Power Level M(KB) |
| 0 | OFF | — | 0 |
| 1 | Wm(1) | 116–140 | 2 |
| 2 | Wm(2) | 116–140 | 3 |
| 3 | 150 | 141–165 | 5 |
| 4 | 175 | 166–190 | 6 |
| 5 | 200 | 191–215 | 7 |
| 6 | 225 | 216–240 | 8 |
| 7 | 250 | 241–265 | 8 |
| 8 | 275 | 266–290 | 9 |
| 9 | 300 | 291–315 | A |
| A | 325 | 316–340 | B |
| B | 350 | 341–365 | B |
| C | 375 | 366–390 | C |
| D | 400 | 391–415 | D |
| E | 425 | 416–440 | D |
| F | 450 | 441–465 | D |

In the illustrative embodiment each of heating elements 14–18 is operated as a regular surface unit. The user selects the desired power setting by manipulation of the corresponding one of control knobs 28–32. Control means 46 then switches the associated heating element into conduction for the number of control intervals during each control period to implement the duty cycle associated with the selected heat setting. The duty cycle for each of the heat settings is shown in Table 1.

In the Griddle mode, the griddle is positioned over the automatic surface unit 12 and standard surface unit 14. Griddle temperature is measured by the automatic surface unit temperature sensor 34. It will be recalled that an object of the present invention is to automatically adjust the output power for the standard surface unit so as to provide relatively even temperature distribution in the griddle at the user selected temperature.

TABLE III

| Power Level | % On | 6" Std. (Watts) (Element 14) | 6",8" Griddle (Watts) (Element 12) |
|---|---|---|---|
| 15 | 100% | 1350 | 1870 |
| 14 | 87.5 | 1181 | 1636 |
| 13 | 75 | 1013 | 1402 |
| 12 | 62.5 | 844 | 1169 |
| 11 | 50 | 675 | 935 |
| 10 | 44 | 594 | 823 |
| 9 | 37.5 | 506 | 701 |
| 8 | 31.5 | 425 | 589 |
| 7 | 25 | 338 | 468 |
| | | | 411 |
| 6 | 22 | 297 | |
| 5 | 16 | 216 | |
| 4 | 12.5 | 169 | 299 |
| 3 | 9 | 122 | 234 |
| 2 | 6.5 | 88 | 168 |
| | | | 122 |
| 1 | 3 | 41 | 56 |
| OFF | 0 | 0 | 0 |

The achievement of even temperature distribution is complicated under steady state conditions, that is, after both surface units have been heated to the steady state temperature, because the automatic surface unit as configured for griddle operation is a higher wattage unit than the standard surface unit. It will be recalled that element 12 comprises three elements selectively connected in parallel configuration. More specifically, the user may select the innermost element 12(a) alone, elements 12(a) and 12(b) in parallel or all three in parallel for normal automatic surface unit operation. For griddle use, elements 12(b) and 12(c) are energized in parallel. When operated at 100% duty cycle the rated output power for this configuration is 1870 watts. Standard surface unit 14, when operated at 100% duty cycle, is rated at 1350 watts. The output power for each unit for the 15 available applied power levels is shown in Table III. As shown in Table 111 operating both units at the same duty cycle results in the output power for element 12 being approximately 30% higher than the output power for element 14.

In accordance with the present invention, relatively even temperature distribution under steady state conditions is achieved by operating the standard heating element 14 at a power level established as a function of the power level applied to the automatic surface unit which compensates for the rated wattage difference between the two elements. Referring again to Table 111 diagonal dotted lines are drawn between relatively equal output power levels. For example, the output power of element 12 when operated at power level 2 (6.5% duty cycle) equals 122 watts, which is the same as the output power level for element 14 when operated at power level 3 (9% duty cycle). As shown in Table 111, when power levels 2–5 are applied to element 12, approximately equal output power for element 14 is achieved in each instance by operating it at the next highest power level, i.e. levels 3–6 respectively. Similarly, when power levels 6–13 are applied to element 12, approximately equal output power is obtained from element 14 by applying power levels 2 levels higher, i.e. levels 8–15, respectively. At the extreme low end, power level 1, both units are operated at power level 1. At the other extreme, if element 12 is operated at power levels higher than 13, the output power substantially exceeds the maximum output power from element 14 at 100% duty cycle. Thus, in the Griddle mode, the maximum level allowed for element 12 is level 13. By operating element 14 at the same level as element 12 for selected level 1; at one level higher than element 12 for selected levels 2–5; and 2 levels higher for selected levels 6–13, the output power of both surface units is controlled to approximately equal levels resulting in relatively even steady state heating of the griddle.

Undesirable uneven heating of the griddle can also result from initial conditions in which both units are not in the same relative temperature condition at the beginning of griddle operations. For example, the regular surface unit may already be hot due to prior use and the automatic surface unit may be at room temperature. It will be recalled that in the Fry mode the automatic surface unit may be initially driven at a power level which is much higher than the steady state level for the selected temperature in order to rapidly bring the unit up to the desired temperature range. Since in the control arrangement just described, element 14 is driven at one or two levels higher than that applied to element 12, if element 14 is already at or near the desired level when the griddle operation begins, it will be overdriven during the heat-up phase for element 12 resulting in that portion of the griddle proximate the element 14 being overheated. Conversely, and perhaps of greater concern is the reverse situation in which element 14 is at room temperature, but the automatic surface unit has just been operating at a relatively high power level and hence is quite hot. In this situation the sensed utensil temperature is likely to reach the desired steady state range very quickly, and thereafter only the steady state power level is applied to element 14. Under such conditions, element 14 will heat up relatively slowly requiring a potentially substantial time lapse before the griddle portion proximate element 14 approaches the desired temperature. In the extreme case in which newly selected griddle temperature happens to be less than the operating temperature achieved during the prior use of element 12, the sensed utensil temperature may very quickly exceed the desired range in which case the power level applied to element 12 drops to zero until the sensed utensil temperature falls to the desired range, and element 14 will require an even longer time to bring the proximate griddle area up to the desired temperature.

It will be recalled that another objective of the present invention is to provide a control arrangement which overdrives the standard surface unit when the standard unit is relatively cool and the automatic surface unit is relatively hot and which de-energizes the standard unit when it is relatively hot and the automatic surface unit is relatively cool to quickly bring both surface units to approximately the same heating level for uniform heating of the griddle, regardless of the relative initial temperature conditions of the two elements.

In accordance with this aspect of the invention temperature information for assessing the initial condition of automatic surface unit 12 is provided by utensil temperature sensor 34. However, no temperature sensor is provided for standard surface unit 14. In lieu thereof a counter designated a heater energy counter is implemented in the electronic control to provide approximate temperature information for surface unit 14. The heater energy counter is incremented and decremented in such a way that its count is approximately proportional to the temperature of element 14. To deal with initial conditions of unequal temperature distribution the energization of the standard surface unit is controlled as a function of the power level applied to the automatic surface unit and also as a further function of the sensed utensil temperature and the count of the heater energy counter to operate standard surface unit 14 at a higher than normal power level when the standard unit is relatively cool and the automatic surface unit is relatively hot and to underdrive or de-energize the standard surface unit when the standard unit is relatively hot and the automatic surface unit is relatively cool.

It will be appreciated that since unequal initial temperature conditions can present transient uneven heating of the griddle regardless of the relative wattage rating for the surface units involved, this aspect of the present invention is applicable to cooking appliances using elements of equal power ratings as well as appliances such as the illustrative embodiment in which different wattage elements are used.

The heater energy counter is described herein only to the extent necessary for an understanding of the present invention. A more detailed description of the concept and further examples of other uses of the approximate temperature information derived from the counter may be found in commonly assigned U.S. Pat. Nos. 4,551,618 and 4,443,690, which are hereby incorporated by reference.

The heater energy counter is premised on the notion that the temperature of a heating element reflects the net energy balance of the heating element. When power is initially applied to the heating element at room temperature energy is being added to the heating element from the power supply at a rate greater than the heating element dissipates the energy through radiation and conduction by heat transfer to the surroundings resulting in a net increase in the energy level of the element. This net increase in energy level results in an increase in the temperature of the heating element. Eventually, the heating element reaches a temperature at which it is dissipating energy at a rate equal to the energy being provided from the power supply, at which time the temperature levels off, and the system operates in its steady state phase or mode. When the heating element is de-energized, the heating element dissipates energy resulting in a temperature decrease until the heating element temperature returns to room temperature.

By incrementing and decrementing a counter at rates which approximate the rates at which the net energy balance of the heating element increases or decreases, the count of the energy counter at any point in time is approximately proportional to the net energy level characterized by a particular temperature. Thus, it is possible to empirically determine a counter increment rate for each power setting which is approximately proportional to the rate of temperature increase or energy increase for the heating element for that particular power setting. By incrementing the counter at that rate when that power setting is selected the count of the counter is approximately proportional to the temperature of the heating element.

In the illustrative embodiment an increment rate is selected which provides the desired net increase in the count at the end of each control period representing the approximate increase in temperature of the heating element during that control period for the duty cycle at which the element is operating. The number of counts which the energy counter is incremented each energized control interval for the various power settings is shown in Table I.

The increment rate per control period is selected to empirically approximate the rate of increase of the heating element temperature for each of the power settings by attempting to linearly approximate the temperature versus time curve for the heating element at each of the power settings. Various approximating techniques could be employed to arrive at the desired increment rate for each power setting, depending upon the degree of accuracy desired. The linear approximations expressed as constant increment rates per control period in Table I have been found to provide satisfactory results for the functions performed by the control arrangement of the present invention. This results from a compromise between approximation accuracy and implementation economy. If greater accuracy is desired, rates which are more precisely tailored to each power setting could be empirically determined and readily implemented at the cost of a substantial increase in required microprocessor memory storage capacity.

A different decrement rate for different power groups is implemented in response to changes from higher to lower power settings, as well as to the OFF setting. As shown in Table I, maximum counts are provided for the various power settings. Power settings 1-3 have a maximum count of 4096, settings 4-6 have a maximum count of 5120, settings 7-10 have a maximum count of 6144, and settings 11-15 have a maximum count of 8192. It has been empirically determined that the maximum counts provide satisfactory approximations of the maximum temperature of the heating element. Obviously, a more accurate approximation would result if a different maximum count were used for each individual power setting.

In the special case of utilizing the heater energy counter with a surface unit heating a griddle, a close correlation between griddle temperature and heater energy count has been empirically established. The empirical relationship between temperature and heater energy counter count shown in Table IV was measured by driving surface unit 14 at full power and measuring the surface temperature of the griddle above the surface unit with a thermocouple. Further, the nature of the load on the griddle has been found to have a negligible effect on this relationship. Consequently, in the griddle mode the count of the heater energy counter can be used to approximately track the griddle temperature proximate element 14.

TABLE IV

| HEC Count | Griddle Surface Temperature °F. |
| --- | --- |
| 512 | 103 |
| 768 | 121 |
| 1024 | 140 |
| 1280 | 160 |
| 1536 | 185 |
| 1792 | 210 |
| 2048 | 232 |

TABLE IV-continued

| HEC Count | Griddle Surface Temperature °F. |
| --- | --- |
| 3072 | 328 |
| 4096 | 386 |
| 5120 | 458 |
| 6144 | 491 |

As previously mentioned, the object of this aspect of the invention is to detect initial temperature differentials between the automatic surface unit and the standard surface unit and overdrive or underdrive the standard surface unit as appropriate to rapidly bring both units to approximately the same temperature to provide an even temperature distribution over the griddle. To this end, a first predetermined reference temperature is established to define a relatively cool automatic surface unit. If the sensed utensil temperature is less than this reference, it is considered relatively cool. Similarly, a first predetermined reference heater energy count is established to define a relatively hot standard surface unit. If the count of the heater energy counter exceeds this count, it is considered relatively hot. If the sensed utensil temperature is less than the first reference temperature and the heater energy count exceeds the first reference count, the standard unit is at least underdriven, i.e. operated at or lower than normal power level, and preferably de-energized, until the sensed utensil temperature exceeds the first reference temperature, to rapidly alleviate uneven heating resulting from a pre-heated standard surface unit.

In the illustrative embodiment the automatic surface unit is considered relatively cool if the sensed utensil temperature is less than 116° F. The standard surface unit element 14 is considered relatively hot if the heater energy count is greater than 6K which signifies that surface unit 14 has exceeded the steady state temperature level for power level 10 (see Table I). When the sensed utensil temperature is less than 116° F. and the heater energy count exceeds 6K, the standard unit is de-energized to allow the standard unit to cool down toward the sensed utensil temperature.

The reference temperature was selected at 116° F. because this is the lowest temperature threshold detectable using the temperature measuring arrangement of the illustrative embodiment. The heater energy reference count of 6K (actually 6144) has been empirically found to provide satisfactory performance. However, it will be appreciated that the precise value of these references is not critical. The function of the references is to identify a temperature differential large enough that correction is desirable. Any values which perform this function could be similarly employed.

To alleviate uneven heating due to a preheated automatic surface unit and a relatively cool standard surface unit, the control system looks at the sensed utensil temperature and the selected temperature setting. If the utensil temperature is greater than an appropriate predetermined reference value, then the heater energy counter is looked at to determine if the standard surface unit 14 is sufficiently cool to require an extra power boost to get up to temperature.

To this end, advantageous use is made of the correlation between griddle temperature proximate surface unit 14 and the count of the heater energy counter (Table IV). As the sensed utensil temperature reaches one or more representative levels, the heater energy count is monitored to determine if the standard surface unit has reached corresponding levels. If not, the standard surface unit is overdriven, i.e. a power levels higher than the normal power level is applied to the standard surface unit, until the corresponding reference count is reached. In order to avoid overheating the standard surface unit, the reference heater energy counter counts should be selected to correlate with temperatures somewhat lower than the corresponding reference sensed utensil temperatures.

In the illustrative embodiment three representative temperature levels and corresponding heater energy counts are provided, one or more of which are used depending upon the user selected temperature being implemented. The first representative reference temperature level is 116° F. The corresponding reference heater energy counter count is 512 which represents a griddle temperature of approximately 103° F. If the sensed utensil temperature is greater than 116° F. and the heater energy count is less than 512, standard surface unit 14 is overdriven at least until the count reaches 512.

For the first three temperature setting selections KB=1-3, the desired steady state griddle temperature is in the 116°-165° F. range. Thus, for these settings overdriving of the standard surface unit after the count has reached 512 is not necessary and may result in overheating the griddle proximate element 14. Thus, overdriving of surface unit 14 is terminated when the heater energy count reaches 512 for heat settings 1-3.

For higher heat settings a second representative reference temperature level of 140° F. and a count of 768 corresponding to a griddle temperature proximate unit 14 of approximately 121° F. are used. If the sensed utensil temperature is greater than 140° F. and the count of the heater energy counter is less than 768, the standard surface unit is overdriven until the count reaches 768. As a further enhancement, an additional level is similarly employed. The temperature reference level is 165° F. and the reference count is 1024 corresponding to a griddle temperature of approximately 140° F. When the sensed utensil temperature is greater than 165° F., standard element 14 is overdriven until the heater energy count reaches 1024. However, to avoid overheating element 14 for the desired temperature setting of 175° F. (KB=4), the element should not be overdriven beyond the count of 768 unless the selected temperature is 200° F. or above (KB>4).

When the sensed utensil temperature, heater energy counter and temperature setting conditions indicate that the standard surface unit is to be overdriven, the standard unit is energized at a power level 6 levels higher than the power level then being applied to the automatic surface unit subject to the maximum power limit at power level 15, until the heater energy counter count exceeds the appropriate reference value, at which time the power control reverts to the steady state mode.

It will be appreciated that additional or fewer reference levels than the three used in the illustrative embodiment could be used depending upon performance requirements. Similarly, the reference values used in the illustrative embodiment have been found to satisfactorily perform the function of identifying the existence of an undesirable temperature differential between the automatic surface unit and the standard surface unit and facilitating correction of this condition. Other values could be similarly employed within the concept of the invention.

A description of an illustrative control circuit for carrying out the control arrangement of this invention follows.

Circuit Description

Figure 5:
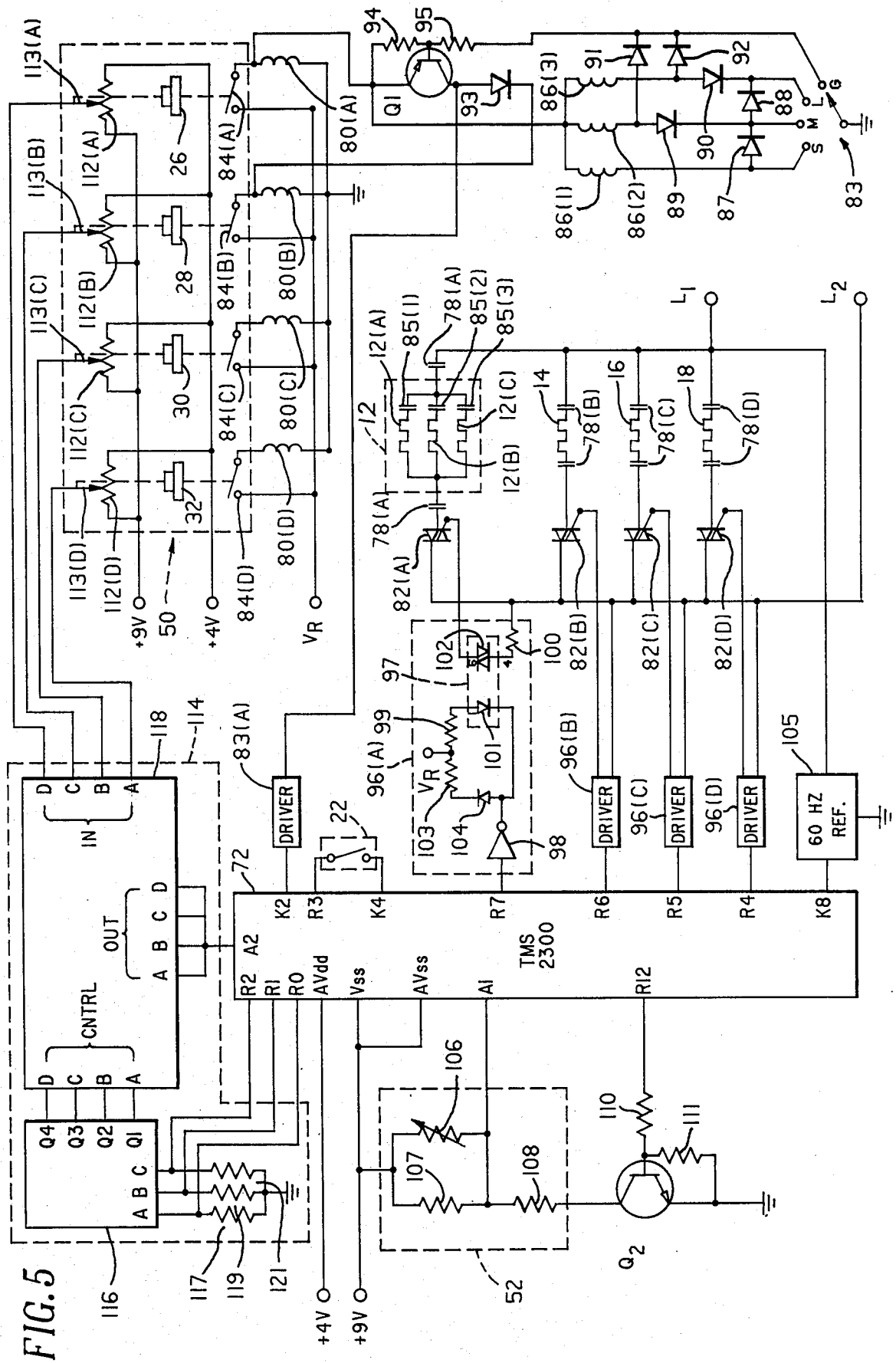
FIG. 5 is a simplified schematic diagram of a control circuit for the range of FIG. 1.

A control circuit illustratively implementing the hereinbefore described operating modes and illustratively embodying the griddle power control arrangement of the present invention is represented in simplified schematic form in FIG. 5. Power to energize heating elements 12-18 is provided by application of a standard 60 Hz AC power signal of either 120 or 240 volts across terminals L1 and L2. Heating elements 12-18 are arranged in electrical parallel fashion across lines L1 and L2 via normally open relay contacts 78A-78D controlled by relay coils 80A-80D and power control triacs 82A-82D respectively. Each of on-off relay coils 80A-80D is serially connected between DC reference voltage supply of $V_R$ and system ground via ON/OFF switch contacts 84A-84D respectively. Each of switch contacts 84A-84D is mechanically coupled in conventional manner (illustrated schematically) to control knobs 26-32 respectively such that each of switch contacts 84A-84D is in its open position when its associated control knob is in its off position. Movement of its associated control knob from its off position places the switch in its closed position, energizing the associated one of coils 80A-80D which in turn closes associated contacts 78A-78D respectively thereby enabling the corresponding one of power control triacs 82A-82D to control energization of the corresponding heating element.

Heating element 12 is a 3-in-1 heating element comprising three resistive elements 12(A)-12(C) selectively interconnected in parallel by relay contacts 85(1), 85(2) and 85(3). These elements are respectively structurally configured as concentric helical elements with the innermost element being 12(A) and the outermost 12(C). When such a unit is used as a standard automatic surface unit, the user may elect to have only 12(A), the innermost coil, energized by the control circuit, or 12(A) and 12(B) or all three depending upon the diameter of the utensil being heated. 12(A) alone functions as a 4" element. 12(A) and 12(B) together function as a 6" element and all three together function as a 8" element. For griddle operation, the outer two elements 12(B) and 12(C) are energized. Selector switch 83 enables the user to select the 4", 6" or 8" configurations or the griddle configuration by switching switch 83 to positions S, M, L or G respectively. Selector switch 83 is positioned by user manipulation of control knob 23 (FIG. 1).

Relay contacts 85(1)-85(3) are controlled by relay coils designated 86(1)-86(3) respectively, which are selectively energized according to the position of selector switch 83. Coils 86(1)-86(3) are commonly connected at one side. Blocking diodes 87 and 88 are connected between the other side of coils 86(1) and 86(2) and between 86(2) and 86(3) respectively. Coil 86(2) is coupled to ground via diode 89 and position M contact of switch 83. Coil 86(3) is similarly coupled to ground via diode 90 and position L contact of switch 83. Coils 86(2) and 86(3) are also coupled to ground via diodes 91 and 92 respectively and the position G contact of selector switch 83. By this arrangement, when ON/OFF switch 84A is closed, i.e. in its ON position, and when selector switch 83 is in position S, closed to contact S, coil 86(1) is energized closing contacts 85(1). When selector switch 83 is in position M, a current path to ground for coil 86(1) is provided via diode 87 and coils 86(1) and 86(2) are both energized closing relay contacts 85(1) and 85(2). With switch 83 in position L, a current path to ground is provided for coil 86(1) via diodes 87 and 88, for coil 86(2) via diode 88 and for coil 86(3) resulting in energization of all three coils, closing relay contacts 85(1), 85(2) and 85(3).

In switch position G, the griddle position, current paths are provided for coils 86(2) and 86(3) via diodes 91 and 92 respectively, closing contacts 85(2) and 85(3), and coil 86(1) is de-energized.

Once the appropriate ones of contacts 85(1)-85(3) are closed by manipulation of knob 23 which controls switch 83, the selected combination of elements 12(A)-12(C) is duty cycle controlled as a single heating element via triac 82A.

In addition to enabling energization of elements 12(B) and 12(C), selector switch 83 in position G also enables energization of heating element 14, which is the standard surface unit which is used in combination with the automatic surface unit in the griddle mode, by shunting ON/OFF switch 84(B) to provide a current path for coil 80(B) via ON/OFF switch 84(A) transistor Q1 and diode 93. The emitter of transistor Q1 is coupled to dc reference voltage $V_R$ via ON/OFF switch 84(A). Its collector is coupled to the ungrounded side of coil 80(B) via diode 93. The collector is also coupled to input port K2 of microprocessor 78 via diode 93 and driver circuit 83A. Biasing resistors 94 and 95 are respectively connected between emitter and base, and base and position G contact of selector switch 83. With switch 83 in position G, the closing of ON/OFF switch 84(A) turns on transistor Q1 providing a current path to ground through diode 93 and coils 80(B) closing contacts 78(B), in addition to the closing of contacts 78(A) and 85(2) and 85(3) as previously described.

Microprocessor 72 controls the switching of power control triacs 82A-82D by trigger signals provided at output ports R7, R6, R5 and R4 respectively. The signals at output ports R7, R6, R5 and R4 are coupled to the gate terminal of the associated triacs via driver circuits 96A-96D respectively. Referring to circuit 96A, which is shown in greater detail, the trigger signal at R7 is coupled to pin 2 of opto-isolator device 97 by inverting buffer amplifier 98. Pin 1 of opto-isolator 97 is coupled to DC reference voltage supply via current limiting resistor 99. The output return pin 4 of opto-isolator 97 is coupled to power line L2 via current limiting resistor 100. Pin 6 is coupled to the gate terminal of power control triac 82A which is connected in series with heating element 12. The trigger signal at R7 is inverted by amplifier 98 forward biasing light emitting diode 101 of opto-isolator 97 which in turn switches the bi-polar switch portion 102 of opto-isolator 97 into conduction to apply a gate signal to power control triac 82A switching it into conduction. The output of amplifier 98 is also coupled to the DC reference voltage supply $V_R$ via current limiting resistor 103 and diode 104. Driver circuits 96B-96D are similarly configured.

A 60 Hz pulse train is generated by conventional zero crossing detector circuit 105 coupled between L1 and input port K8 with microprocessor 72 to facilitate synchronization of triac triggering and other control system operations with zero crossings of the 60 Hz AC power signal applied across L1 and L2.

Sensed utensil temperature inputs are provided to microprocessor 72 via temperature sensing means 52 comprising a thermistor device 106 connected in parallel with linearizing precision resistor 107 and in series with precision resistor 108 forming a voltage divider network energized by a regulated +9 volt dc voltage supply. The divider network is coupled to ground through transistor Q2. The junction of thermistor 106 and resistor 108 is coupled to microprocessor input port A1. The analog voltage at this point is proportional to the temperature sensed by the thermistor. Microprocessor 72 has an internal 8-bit A/D converter which operates between voltage rails AVSS and AVDD which are set at 9 volts DC and 4 volts DC respectively, to provide a 5 volt voltage swing. The internal A/D converter measures the input voltage signal at A1 and converts this signal to a corresponding digital value. Table V lists representative values of the thermistor resistance, and corresponding temperature and analog voltage values. Also shown in Table V is the Hexadecimal representation of the corresponding 8 bit binary code resulting from the A/D conversion of the analog voltage values.

Transistor Q2 together with biasing resistors 110 and 111 functions as a disabling circuit. Output port R12 of microprocessor 72 is coupled to the base of Q2 via resistor 110. Resistor 111 is connected between the emitter and the base of transistor Q2. The function of the disabling circuit is to only allow current flow through thermistor 106 when temperature measurements are being made. To this end, when a temperature measurement is to be made microprocessor 72 sets output R12 causing a positive voltage to be applied to the base of Q2 via resistor 110 switching Q2 into conduction. After the temperature input is obtained, R12 is reset rendering Q2 and thermistor 106 non-conductive.

TABLE V

| Temperature °F. | Resistance (Ω) | Analog Volts | Hex Rep | Dec Rep |
| --- | --- | --- | --- | --- |
| 115 | 22,000 | 4.71 | 24 | 36 |
| 140 | 11,500 | 4.86 | 2C | 44 |
| 165 | 7,600 | 5.04 | 35 | 53 |
| 190 | 5,000 | 5.33 | 44 | 68 |
| 215 | 3,300 | 5.63 | 53 | 83 |
| 240 | 2,100 | 6.02 | 67 | 103 |
| 265 | 1,500 | 6.41 | 7B | 123 |
| 290 | 1,050 | 6.82 | 90 | 144 |
| 315 | 740 | 7.16 | A1 | 161 |
| 340 | 560 | 7.47 | B1 | 177 |
| 365 | 410 | 7.77 | C0 | 192 |
| 390 | 320 | 7.96 | CA | 202 |
| 415 | 250 | 8.14 | D3 | 211 |
| 440 | 200 | 8.27 | DA | 218 |
| 465 | 150 | 8.45 | E3 | 227 |

User inputs are provided to microprocessor 72 via Boil/Fry Mode selection switch means 22, heat setting selection means 50 comprising imput potentiometers 112(A)-(D) associated with heating elements 12-18 respectively and selection switch 23. Mode selection switch 22 is directly coupled between output port R2 and imput port K4 of microprocessor 72. The open and closed states of switch 22 signify selection of the general Boil Mode and Fry Mode, respectively. Microprocessor 72 determines the state of switch 22 by periodically generating a logical high signal at R3 and monitoring the input signal at K4. The input at K2 of microprocessor 72 informs the microprocessor if the griddle mode has been selected. Input K2 is derived from the collector of transistor Q2 and driver circuit 83A. It will be recalled that when switch 83 is in position G, the griddle position, Q1 is turned on. The resulting current signal is input to driver circuit 83A resulting in a logic high or one signal being delivered to input K2 signifying that the griddle mode has been selected. When Q1 is off, a logic low or zero signal appears at K2.

Each of input potentiometers 112(A)-(D) is coupled between a regulated 9 volt dc and a regulated 4 volt dc reference voltage supply. Each of wiper arms 113(A)-(D) of potentiometers 112(A)-(D) respectively is coupled to A/D input port A2 of microprocessor 72 via multiplexing circuit 114. Each wiper arm is positioned by user rotation of the associated one of control knobs 26–32. The voltage between the wiper arm and the 4 volt supply is an analog signal representing the selected heat setting. The internal A/D converter of microprocessor 72 described briefly above for processing the temperature inputs processes analog voltages appearing at A2 representing the user input settings in multiplex fashion.

Multiplexing circuit 114 comprises a conventional decoding circuit 116 configured to function as a 3 line to 4 line decoder and a gating circuit 118 which gates the appropriate wiper arm voltage signal to microprocessor input port A2. Multiplexing is controlled by scanning signals generated at output ports R0, R1, and R2, which are coupled to input ports A, B, and C of decoder 116. Biasing resistors 117, 119, and 121 are connected between R0, R1, and R2 respectively and ground. Decoder outputs Q1-Q4 are coupled to the control ports A-D of gating circuit 118. Input ports A-D of gating circuit 118 are connected directly to wiper arms 113(D)-(A) respectively. Output ports A-D of gating circuit 118 are commonly connected to input port A2 of microprocessor 72. The scan signals at R0, R1, and R2 sequentially generate enabling signals at outputs Q1-Q4. These enabling signals are coupled to the control inputs of gating circuit 118 to sequentially couple the analog wiper arm voltage signals from input ports A-D to A2 of microprocessor 72.

The processing of the resultant digitized temperature and power setting input signals will be described in conjunction with the following description of the control program.

The following component values are suitable for use in the circuit of FIG. 5. These values are illustrative only, and are not intended to limit the scope of the claimed invention.

| Fixed Resistors (Ω) | | | | Transistors | |
|---|---|---|---|---|---|
| 99 | 1K | 124 | 10K | Q1 | 2N2907 |
| 100 | 220 | 126 | 10K | Q2 | 2N2222 |
| 103 | 270 | | | Integrated Circuits | |
| 107 | 2.21K | 1% precision | | 97 | MDC 3020 Integrated Circuit |
| 108 | 2.21K | 1% precision | | | |
| 110 | 22K | | | 98 | ULN 2004A Integrated Circuit |
| 111 | 27K | | | | |
| 117 | 10K | | | 116 | CD4028BC Integrated Circuit |
| 119 | 10K | | | | |
| Potentiometers (Ω) | | | | 118 | CD4026BC Integrated Circuit |
| 112A-D | 50K | | | | |
| Thermistor (Ω) | | | | Microprocessor | |
| 106 | 50K | | | 72 | Texas Instruments TMS 2300 |
| Diodes | | | | | |
| 87,88,89,90,91, 92,93,104 | 1N914 | | | Triacs | |
| | | | | 82(A)-(D) | General Electric SC 147 |
| | | | | Surface Units | |
| | | | | 12 | General Electric WB 30 × 346 |
| | | | | 14-18 | General Electric WB 30 × 218 |

Control Program Description

Microprocessor 72 is customized to perform control functions in accordance with this invention by permanently configuring the Read Only Memory (ROM) of microprocessor 72 to implement predetermined control instructions. FIGS. 6 through 16 are flow diagrams which illustrate the control routines incorporated in the control program of microprocessor 72 to perform the control functions in accordance with the present invention. From these diagrams one of ordinary skill in the programming art can prepare a set of control instructions for permanent storage in the ROM of microprocessor 72. For the sake of simplicity and brevity, the control routines to follow will be described with respect to the implementation of the control algorithms of the present invention. It should be understood that in addition to the control functions of the present control arrangement herein described there may be other control functions to be performed in conjunction with other operating characteristics of the appliance. Instructions for carrying out the routines described in the diagrams may be interleaved with instructions and routines for other control functions which are not part of the present invention.

The control program consists of a sequence of routines which act on information stored in the Random Access Memory (RAM) of microprocessor 72. The RAM is arranged in four files, with one file associated with each surface unit. A register designated the X register is used to address the desired one of the four files. The control program is executed once during each control interval for each surface unit sequentially executing the control program on successive RAM files.

Figure 6:
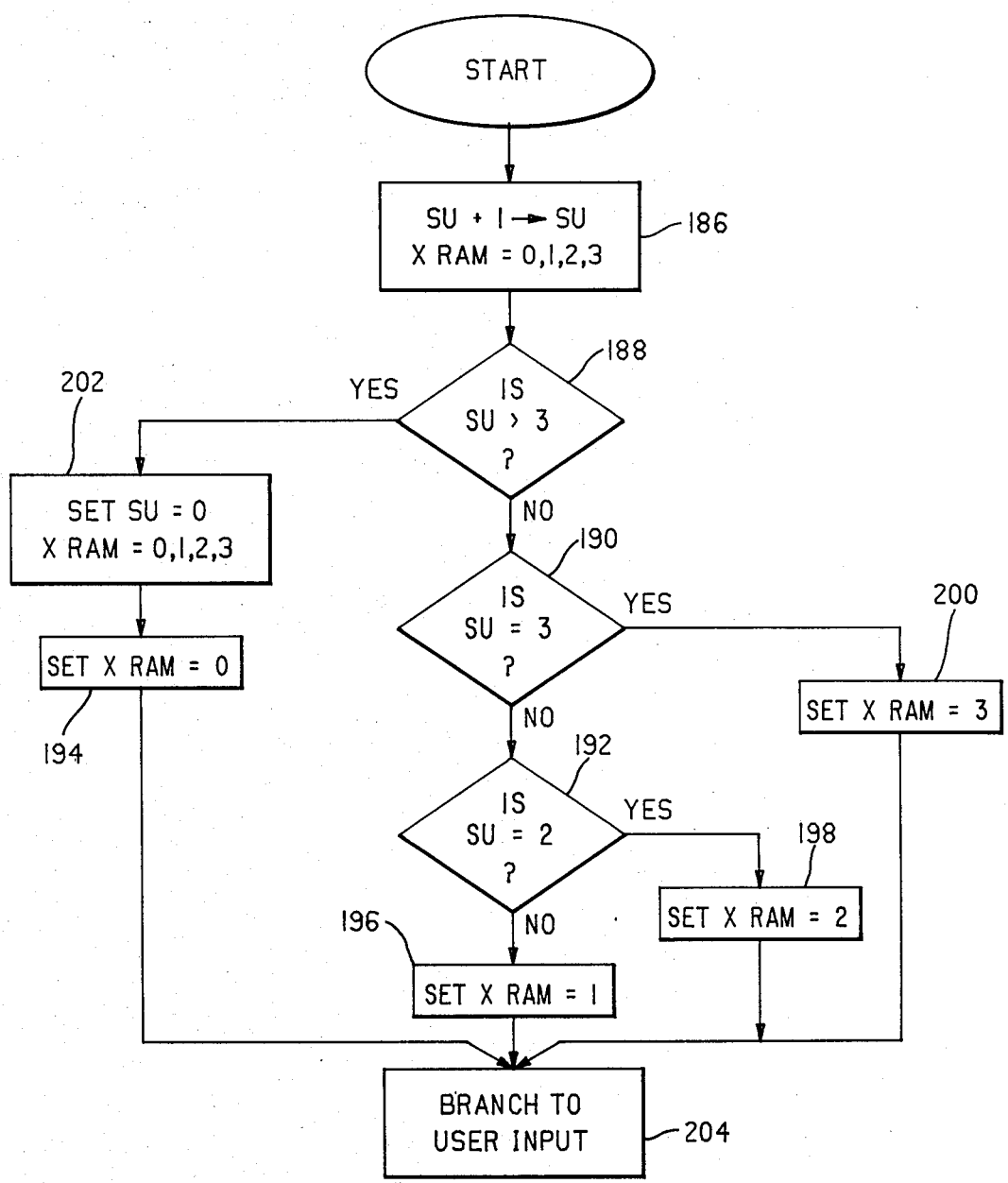
FIG. 6 is a flow diagram of the START routine incorporated in the control program for the microprocessor in the circuit of FIG. 5.

START Routine—FIG. 6

This routine is entered at the beginning of each control interval. Its function is to call up the appropriate RAM file for the ensuing pass through the control program. A counter is provided in each RAM file designated an SU (surface unit) counter. Each SU counter functions as a four count ring counter and used to call up the RAM files sequentially such that each RAM file is called up every fourth pass through the Control Program.

Referring now to FIG. 6, at Block 186 the SU counters in all four files, X=0, 1, 2, 3 are incremented. Inquiries 188, 190 and 192 determine the SU count and call up the appropriate one of RAM files 0, 1, 2 and 3 via Blocks 194, 196, 198 and 200 for SU equal to 1, 2, 3 and 4, respectively. Block 202 resets all of the SU counters to zero when SU equals 4.

Figure 7:
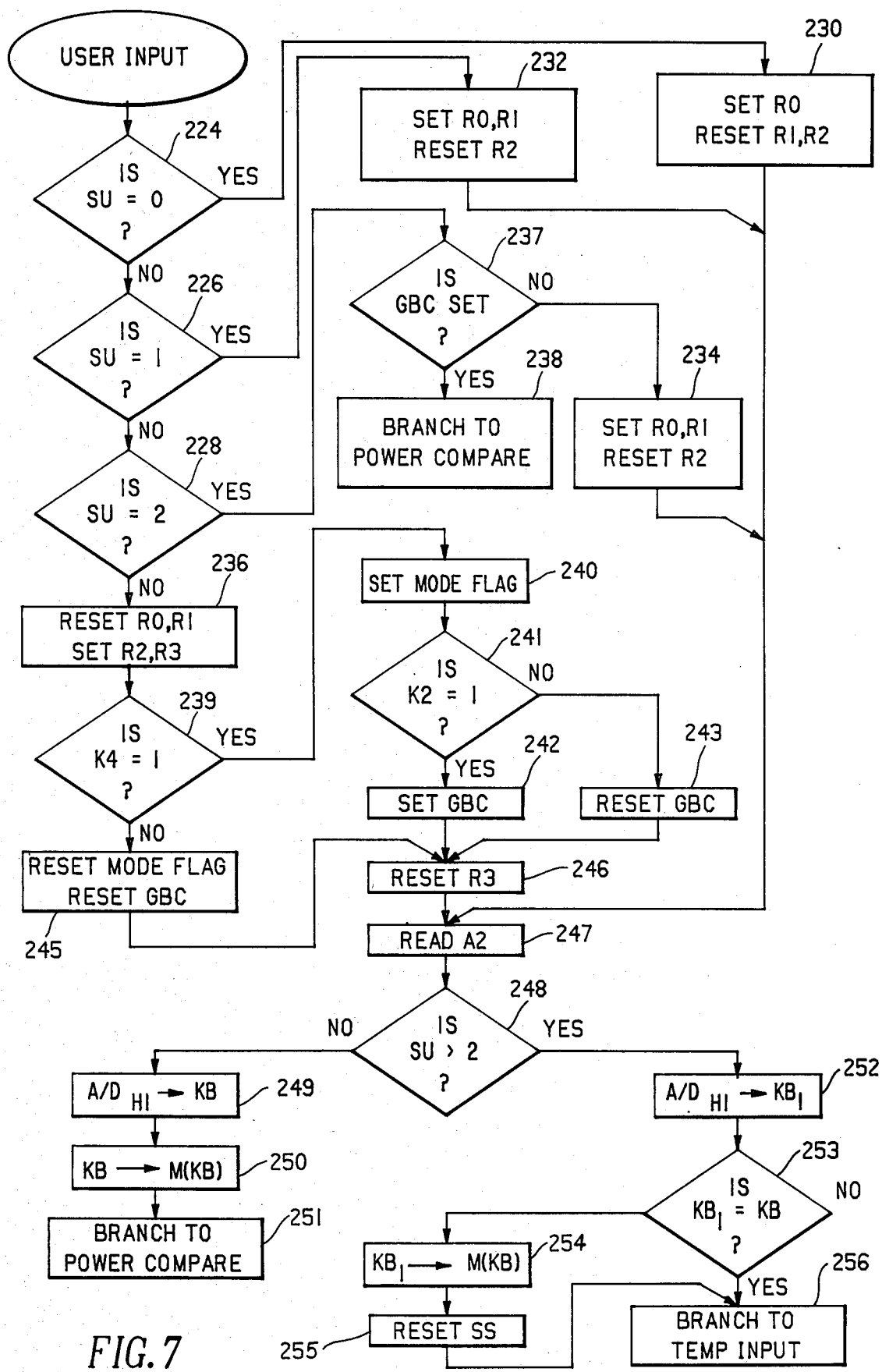
FIG. 7 is a flow diagram of the USER INPUT routine incorporated in the control program for the microprocessor in the circuit of FIG. 5.

After the appropriate RAM file is selected, the program branches (Block 204) to the User Input routine of FIG. 7.

USER INPUT Routine—FIG. 7

The function of this routine is to control the multiplexing of the user selected heat setting input signals at input port A2 via multiplexing circuit 114 (FIG. 5), to determine whether the Boil or Fry mode has been selected for the automatic surface unit, and to determine if the Griddle mode has been selected.

It will be recalled that the control program is executed once during each control interval for each surface unit sequentially. Inquiries 224–228 determine which surface unit the control program is being executed for, that is, which surface unit is the subject of the present pass through the program. The three regular surface units 14–18 are designated SU0–SU2 respectively; SU3 represents automatic surface unit 12. Blocks 230–236 generate the appropriate binary code 100, 010, 110, and 001 for SU0–SU3 respectively at output ports R0, R1 and R2 to gate the appropriate one of wiper arm 103A–103D through gating circuit 118 to input port A2.

If the response at Inquiry 228 is Yes, signifying that the program is being executed for surface unit 14 which is slaved to the automatic surface unit in the Griddle mode, Inquiry 237 checks a flag designated GBC which is set when the Griddle mode has been selected. If set, the program branches to the Power Compare routine, since as will become apparent from discussion of the Griddle and M/S Compare routines hereinafter, the power level for element 14 when in the Griddle mode is determined in those routines independently of the actual setting of knob 28. If GBC is not set, the program proceeds to Block 234 to enable the appropriate input at A2 for element 14.

A No response to Inquiry 228 implies that the program is being executed for SU=3 in which case the appropriate input is enabled at A2 for element 12, and R2 is set (Block 236) to determine the state of mode select switch 22. Inquiry 239 then scans input port K4 to determine whether switch 22 is open (K4=0) or closed (K4=1). If K4=1, signifying selection of the Fry Mode, a Mode Flag is set for future reference in a subsequent routine (Block 240), and Inquiry 241 scans input port K2 to determine if the Griddle mode has been selected. If K2=1 signifying that switch 83 is in position G, the griddle position, the GBC Flag is set (Block 242) signifying operation in the Griddle mode. Otherwise, GBC is reset (Block 243).

Returning to Inquiry 239, if K4=0, signifying selection of the Boil Mode, the Mode Flag, and GBC are reset (Block 245). R3 is then reset (Block 246) and the program proceeds to Block 247.

Having enabled the appropriate input at input port A2, voltage from the enabled one of potentiometers 102A–102D is next converted to a digital signal. It will be recalled that there are 16 possible heat settings, each represented by a corresponding digital signal. The internal A/D conversion routine provided in microprocessor 72 will convert the analog voltage at pin A2 to an eight bit digital code capable of establishing 256 levels. Sixteen wiper arm positions corresponding to 16 power settings are evenly spaced along the potentiometer. By this arrangement the user selected input setting may conveniently be represented by the four high order bits of the 8 bit A/D output signal. The analog input at pin A2 is read in (Block 247) and converted to its corresponding digital signal. The four high order bits of this signal designated $A/D_{HI}$ are stored as the input power setting variable KB for the standard surface units and as the temporary variable $KB_I$ for the automatic surface unit.

Inquiry 248 determines if the present pass through the control is for the automatic surface unit (SU>2). If not, $A/D_{HI}$ is stored as KB (Block 249), KB is stored as M(KB) (Block 250), and the program branches (Block 251) to the Power Compare routine of FIG. 14 to implement the open loop power control strategy. If the program is being executed for the automatic surface unit, $A/D_{HI}$ is stored as $KB_I$ (Block 252). Inquiry 253 determines if $KB_I$ equals the previously stored KB. If $KB_I$ is not equal to KB, this signifies that the power setting selection for the automatic surface unit has been changed. The SS Flag (utilized in the FRY mode hereinafter described with reference to FIG. 10) is reset (Block 255) and the program branches (Block 256) to the Temp Input routine (FIG. 8). If $KB_{HI}$ equals KB, the setting has not been changed and the program branches (Block 256) to the Temp Input routine (FIG. 8) to read in the sensed utensil temperature.

TEMP INPUT Routine—FIG. 8

The function of this routine is to convert the analog voltage at pin A1 representing the sensed utensil temperature to a digital signal representative of the sensed utensil temperature. More specifically, this routine determines within which of 15 predetermined temperature ranges the present sensed utensil temperature falls. A hexadecimal value is assigned to the variable SENINP (and also SENOUT) corresponding to each of the 15 temperature ranges, as shown in Table VI. The hexadecimal value for the upper temperature threshold value for each temperature range is also included in Table VI.

TABLE VI

| Hex Rep SENINP & SENOUT | Temp. Range °F. | Hex Code Upper Threshold |
|---|---|---|
| 0 | T ≦ 115 | 24 |
| 1 | 115 < T ≦ 140 | 2C |
| 2 | 140 < T ≦ 165 | 35 |
| 3 | 165 < T ≦ 190 | 44 |
| 4 | 190 < T ≦ 215 | 53 |
| 5 | 215 < T ≦ 240 | 67 |
| 6 | 240 < T ≦ 265 | 7B |
| 7 | 265 < T ≦ 290 | 90 |
| 8 | 290 < T ≦ 315 | A1 |
| 9 | 315 < T ≦ 340 | B1 |
| A | 340 < T ≦ 365 | C0 |
| B | 365 < T ≦ 390 | CA |
| C | 390 < T ≦ 415 | D3 |
| D | 415 < T ≦ 440 | DA |
| E | 440 < T ≦ 465 | E3 |
| F | 465 < T | |

Referring now to FIG. 8, R12 is set (Block 270) to turn on transistor Q1 (FIG. 5 thereby enabling energization of thermistor 104. Next the analog voltage representing the sensed temperature is read in and converted to its 8 bit digital representation (Block 272). The variable TC in the flow diagram represents the digital value of the analog signal. Inquiries 274–302 determine the temperature range in which the sensed temperature falls and Blocks 304–334 assign the appropriate value to the temperature variable SENINP in accordance with Table V. After establishing the appropriate value for SENINP, R12 is reset (Block 336) to turn off Q2, de-energizing thermistor 106, and the program branches (Block 337) to the Sensor Filter and Timing routine (FIG. 9).

For example, if the sensed temperature is 200° F., the hexadecimal representation of the digital temperature signal will be greater than 44 corresponding to 190° F. and less than 53 corresponding to 215° F. Hence, the answer to Inquires 274–280 will be Yes. The response to Inquiry 282 will be No. The value 4 will be assigned to SENINP (Block 312). Having assigned a value to SENINP, R12 is reset (Block 336) and the program branches (Block 337) to the Sensor Filter and Timing routine (FIG. 9).

Figure 9:
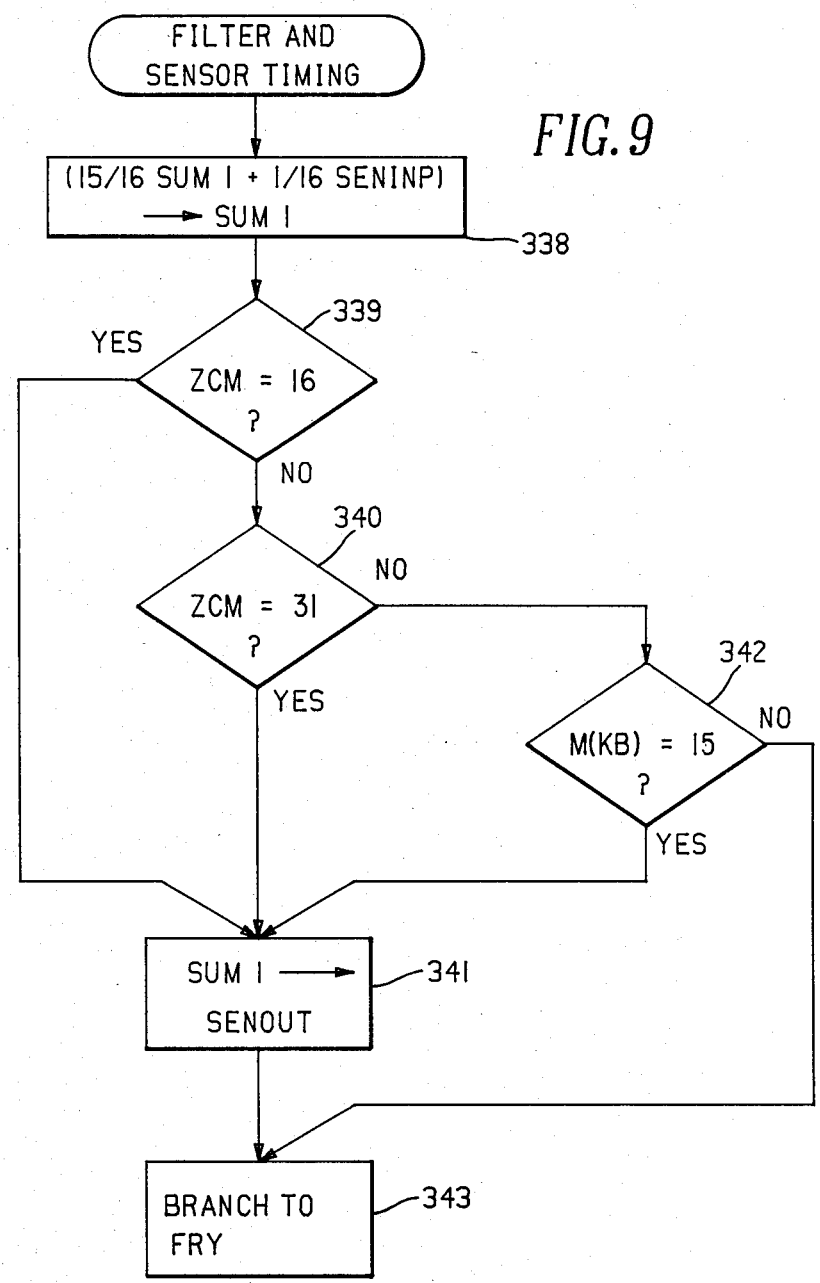
FIG. 9 is a flow diagram of the SENSOR FILTER and TIMING routine incorporated in the control program for the microprocessor in the circuit of FIG. 5.

SENSOR FILTER and TIMING Routine—FIG. 9

This routine performs the dual function of iteratively filtering the sensor output temperature signal SENINP and also controlling the timing of the updating of the temperature signal which is actually used in the control routines yet to be described. The filter function is implemented to minimize the impact of aberrant temperature measurement inputs from the temperature monitoring circuit; the timing function is implemented to minimize the effect of radiant energy from the heating element 12 impinging on thermistor 104 on the accuracy of the temperature measurements.

The iterative filter portion of this routine attaches relatively little weight to each individual input. Hence, isolated erroneous inputs are averaged out so as to have little effect on the accuracy of the cumulative average signal provided by the filter routine. Referring to FIG. 9, the filter function is performed at Block 338. It will be recalled that SENINP is the hexadecimal representation of the temperature range for the sensed utensil temperature determined in the hereinbefore described TEMP INPUT routine. One-sixteenth of the new SENINP input is added to 15/16 of the filter output variable designated SUM 1 from the previous pass through this routine. The resultant sum becomes the new value for the filter output variable SUM 1.

A new temperature input signal SENINP is processed by the filter portion of this routine to generate a new SUM 1, during each pass through the control routine, i.e. once every 133 milliseconds corresponding to 8 cycles of the 60 Hz power signal. However, to minimize the effects of radiant energy for heating element 12 on sensor 50, the sensed utensil temperature signal which is input to the power control portion of the control program is only updated during selected portions of the 4.4 second duty cycle control period.

A counter designated the ZCM counter operates as a 32 count ring counter, counting from 0–31 and resetting to 0. In the duty cycle control implemented in the POWER OUT routine hereinafter described, for duty cycles less than 100% the heating element is energized during the first part of the control period when the ZCM count is relatively low and de-energized while the ZCM count is relatively high. Since, except when operating at the 100% power level, the heating element is always de-energized for count 31, radiant energy effects on the sensor are minimum at ZCM count 31. Thus, radiation effects are minimized by updating SENOUT, the temperature signal utilized in implementation of the Power Control routine only at count 31. It is desirable, however, to have at least two updates of SENOUT during each 4.4 second control period, to limit oscillations between inputs. Hence, SENOUT is also updated at the midpoint of the control period, i.e. at count 16. There is potentially more error due to radiation effects for this measurement; however, the heating element is de-energized at this point for the twelve lower power levels. Hence, the effects of radiation even on this measurement are minimum except at the highest 4 power levels.

When the heating element is operated at 100% duty cycle, the radiation effects are the same at all counts; hence, for maximum accuracy SENOUT is updated during each execution of the control program, i.e. every 133 milliseconds.

Referring again to the flow diagram of FIG. 9, Inquires 339 and 340 look for ZCM counts of 16 and 31, respectively. Upon the occurrence of either count, SENOUT is updated by the then current value of SUM 1 (Block 341). Otherwise, Inquiry 342 checks to determine if the power level presently being implemented is the 100% power level (M(KB)=15). If it is, SENOUT is updated by SUM 1 (Block 341) regardless of the count; if not, Block 341 is bypassed, and SENOUT is not updated during this pass. In this fashion for power levels lower than 15, SENOUT is updated only on counts 16 and 31, and when power level 15 is being implemented SENOUT is updated every count. Upon completion of this routine the program branches (Block 343) to the Fry routine (FIG. 10).

Figure 10:
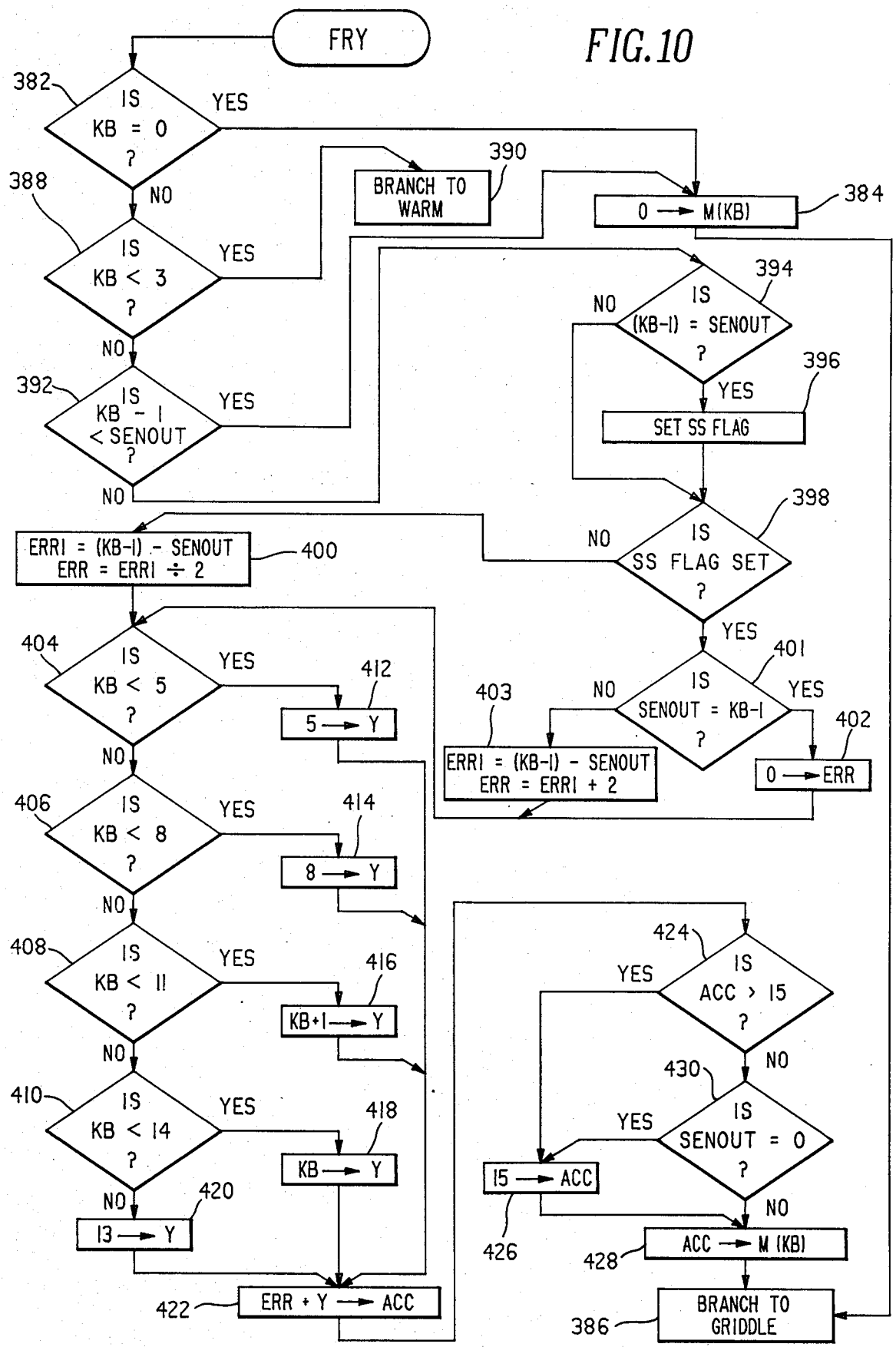
FIG. 10 is a flow diagram of the FRY routine incorporated in the control program for the microprocessor in the circuit of FIG. 5.

FRY Routine—FIG. 10

The function of this routine is to implement the Fry Mode for the automatic surface unit. In the Fry mode the power level applied to the surface unit is established as a function of the selected temperature setting and a first error signal during the transient heat-up phase (which phase is signified by a reset SS Flag) and as a function of the selected power level and a second larger error signal during operation in the steady state phase. The appropriate power level to be applied is established in this routine. To this end, a flag designated the SS Flag is used in this routine to indicate whether or not the sensed utensil has first reached the steady state temperature range for the selected temperature. The SS Flag is set on the first pass through this routine after the selected steady state range is reached. The SS Flag is reset in the previously described User Input routine in response to changes in the temperature selection.

Inquiry 382 checks for an OFF setting (KB=0). If OFF is selected, M(KB), the power control variable utilized in the Power Compare routine, is set to zero (Block 384) and the program branches (Block 386) to the Griddle routine, FIG. 12. Otherwise, Inquiry 388 determines if one of the Warm settings Wm(1) or Wm(2) corresponding to KB less than 3 has been selected (KB<3). If so, the program branches (Block 390) to the Warm routine, FIG. 11. Otherwise, Inquiry 392 compares the sensed utensil temperature SENOUT with the reference value representing the steady state temperature range for the selected heat setting, which is defined as (KB−1). For SENOUT greater than (KB−1), signifying that the sensed utensil temperature exceeds the selected range, Power Level zero is implemented (Block 384), and the program branches (Block 386) to the Griddle routine (FIG. 12). If the sensed utensil temperature is not greater than the desired temperature range, Inquiry 394 determines if (KB−1) equals SENOUT signifying that the sensed utensil temperature is within the selected steady state temperature range. If so, the SS Flag is set (Block 396). By this arrangement the SS Flag is first set when the sensed utensil temperature first reaches the selected steady state range signifying for power control purposes, the transition from the heat up phase to the steady state phase for surface unit 12. Once set, SS remains set unless the selected heat setting is changed.

Next the appropriate error signal is determined. Inquiry 398 checks the state of the SS Flag to determine whether the surface unit is in the heat up phase (SS not set) or the steady state phase (SS set). If SS is not set, a first error signal (ERR) is computed (Block 400) as a function of the difference between the desired temperature range represented by (KB−1) and the sensed utensil temperature represented by SENOUT, by computing the difference between KB−1 and SENOUT and dividing this difference by two. If ERR is a fraction, it is rounded up to the next larger integer. If the SS Flag is not set, a second error signal (also labeled ERR) is calculated. Inquiry 401 determines if SENOUT equals KB−1, signifying that the sensed utensil temperature is in the desired steady state range. If so, the error signal ERR is set to zero (Block 402). Otherwise, the second error signal is set equal to the difference between (KB−1) and SENOUT plus a constant 2 (Block 403). This results in the surface unit being operated at a power level which is at least two levels higher in the steady state phase than in the transient heat-up phase during undershoot conditions except when the error signal would result in a level higher than the maximum level of 15. Since the SS Flag is reset in the User Input routine (FIG. 7) each time the user selected setting is changed, the first error signal computed in Block 400 is used following each change in power setting, until the SS Flag is again set as a result of the sensed utensil temperature first reaching the steady state temperature range for the newly selected heat setting.

After computing the error signal, Inquiries 404–410 identify the user selected heat setting. A variable Y, corresponding to the steady state power level for the selected heat setting, is introduced in Blocks 412–420. The error signal (ERR) is summed with steady state power level variable Y to generate a signal representing the power level to be applied, which is temporarily stored in the accumulator (ACC) (Block 422). Inquiry 424 and Block 426 limit the maximum value to 15 in the event the sum of ERR+Y is greater than 15. The value stored in ACC is then transferred to M(KB) to implement the appropriate power level in the Power Compare routine and the program branches (Block 386) to the Griddle routine (FIG. 12).

To further speed the temperature response of the system in the Fry Mode, power level 15 is implemented when the sensed utensil temperature is less than 116° F. This is implemented by Inquiry 430 which checks the sensed utensil temperature. If the sensed utensil temperature is less than 116° F. (SENOUT=0), ACC is set to 15 (Block 426), resulting in M(KB) being set to 15 (BLock 428), and the program then branches (Block 386) to the Griddle routine, FIG. 12.

Figure 11:
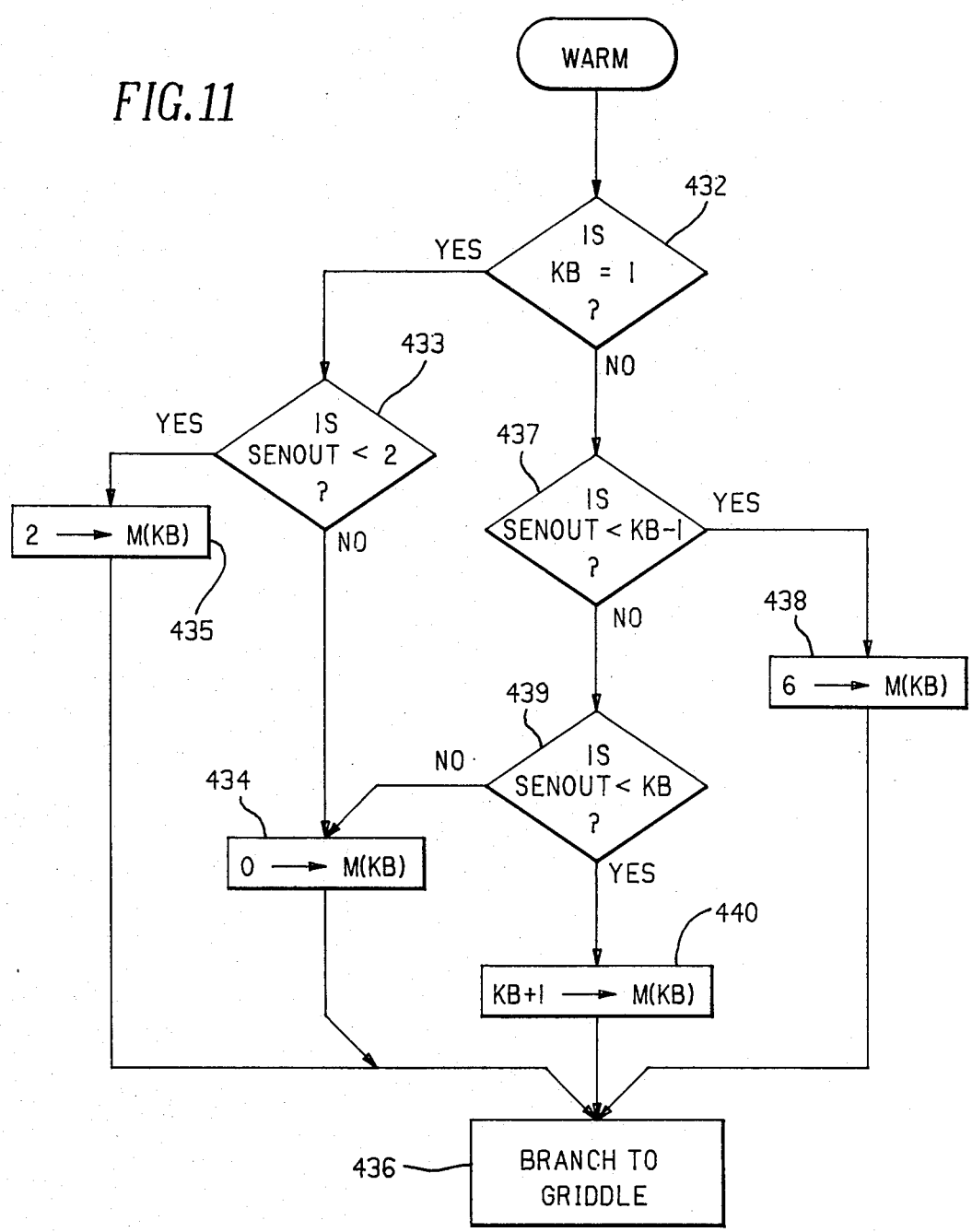
FIG. 11 is a flow diagram of the WARM routine incorporated in the control program for the microprocessor in the circuit of FIG. 5.
Figure 12:
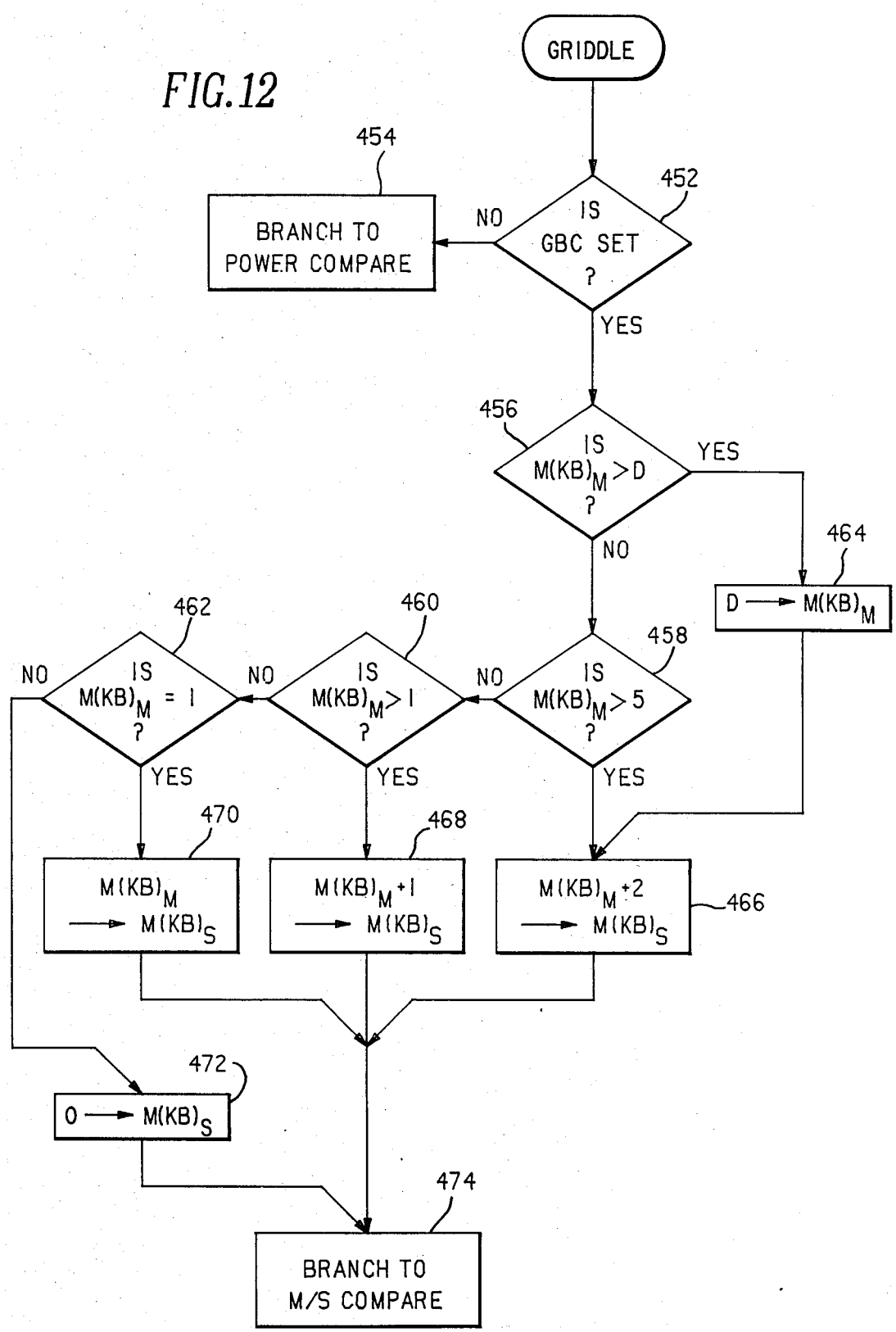
FIG. 12 is a flow diagram of the GRIDDLE routine incorporated in the control program for the microprocessor in the circuit of FIG. 5.

WARM Routine—FIG. 11

This routine is entered from the Fry routine whenever KB is less than 3. The function of this routine is to implement the Warm Mode.

For heat settings KB=1 and KB=2, the maximum warm temperature limit is 140° F. corresponding to SENOUT=2. For KB=3, the maximum warm temperature limit is 165° F. corresponding to SENOUT=3. Inquiry 432 checks for KB=1 representing the Wm(1) setting. For KB=1, Inquiry 433 determines if SENOUT is less than 2. If not, M(KB) is set to zero (Block 434) to de-energize the surface unit. If SENOUT is less than 2 signifying a sensed utensil temperature less than the maximum for KB=1, M(KB) is set to 2 (Block 435), and the program branches (Block 436) to the Griddle routine (FIG. 12).

Returning to Inquiry 432, if KB is not equal to one, Inquiry 437 determines if the sensed utensil temperature variable SENOUT is less than KB−1. If SENOUT is less than KB−1, power level 6 is implemented by setting M(KB) to 6 (Block 438). The program then branches (Block 436) to the Griddle routine (FIG. 12).

If the sensed utensil temperature is not less than (KB−1) the program proceeds to Inquiry 439 which checks for the upper temperature limit for KB=2, and KB=3 which is represented by SENOUT=2, and 3 respectively.

If Inquiry 439 determines that the sensed utensil temperature is less than the maximum warm reference temperature for the selected heat setting (SENOUT<KB), M(KB) is set to (KB+1) (Block 440). This implements the steady state power levels 2, 3 and 4 for heat settings 1, 2 and 3, respectively, corresponding to duty cycles of 6.5%, 9% and 12.5%, respectively (See Tables I and II). If the sensed utensil temperature is not less than the maximum warm reference temperature, M(KB) is set to 0 (Block 434) corresponding to the zero or OFF power level. M(KB) having been set, the program then branches (Block 436) to the Griddle routine (FIG. 12).

GRIDDLE Routine—FIG. 12

This routine is entered from the Fry or Warm routines. Its function is to establish the power level to be applied to standard surface unit 14 referred to herein as the slave surface unit as a function of the power level to be applied to automatic surface unit 12 also referred to herein as the master surface unit to compensate for the wattage rating difference between elements 12 and 14. The variable $M(KB)_M$ is used to represent the power level to be applied to the master unit 12. It will be recalled that this power setting is established as a function of the sensed utensil temperature and the selected temperature range in the Fry or Warm routine. Variable $M(KB)_S$ will be used to represent the power level to be applied to the slave surface unit 14.

Inquiry 452 checks the GBC Flag to determine if the Griddle mode has been selected. If GBC is not set, signifying operation strictly in the Fry mode, the program branches (Block 454) to the Power Compare routine (FIG. 14A). If GBS is set signifying operation in the Griddle mode, Inquiries 456, 458, 460, and 462 determine if the power level for the surface unit 12 corresponds to power levels 14–15, 6–13, 2–5, 1, or 0 respectively. For $M(KB)_M$ equal to 14 or 15, $M(KB)_M$ is changed to 13 (Block 464). Power level 13 is the maximum power level to be applied to the larger surface unit when operating in the Griddle mode, so as not to exceed the maximum output power achievable for the smaller slave unit. Block 466 sets $M(KB)_S$ at two levels higher than $M(KB)_M$ for $M(KB)_M$ greater than 5. For power levels 2–5 $M(KB)_S$ is set at one level higher than $M(KB)_M$ (Block 468). For M(KB)=1 which is the lowest non-OFF power setting, the $M(KB)_S$ is set equal to $M(KB)_M$ (Block 470) and for $M(KB)_M$ equal to 0, $M(KB)_S$ is also set equal to 0 (Block 472). Having established the appropriate steady state values for $M(KB)_S$ as a function of $M(KB)_M$, the program branches (Block 474) to the M/S Compare routine of FIG. 13.

Figure 13:
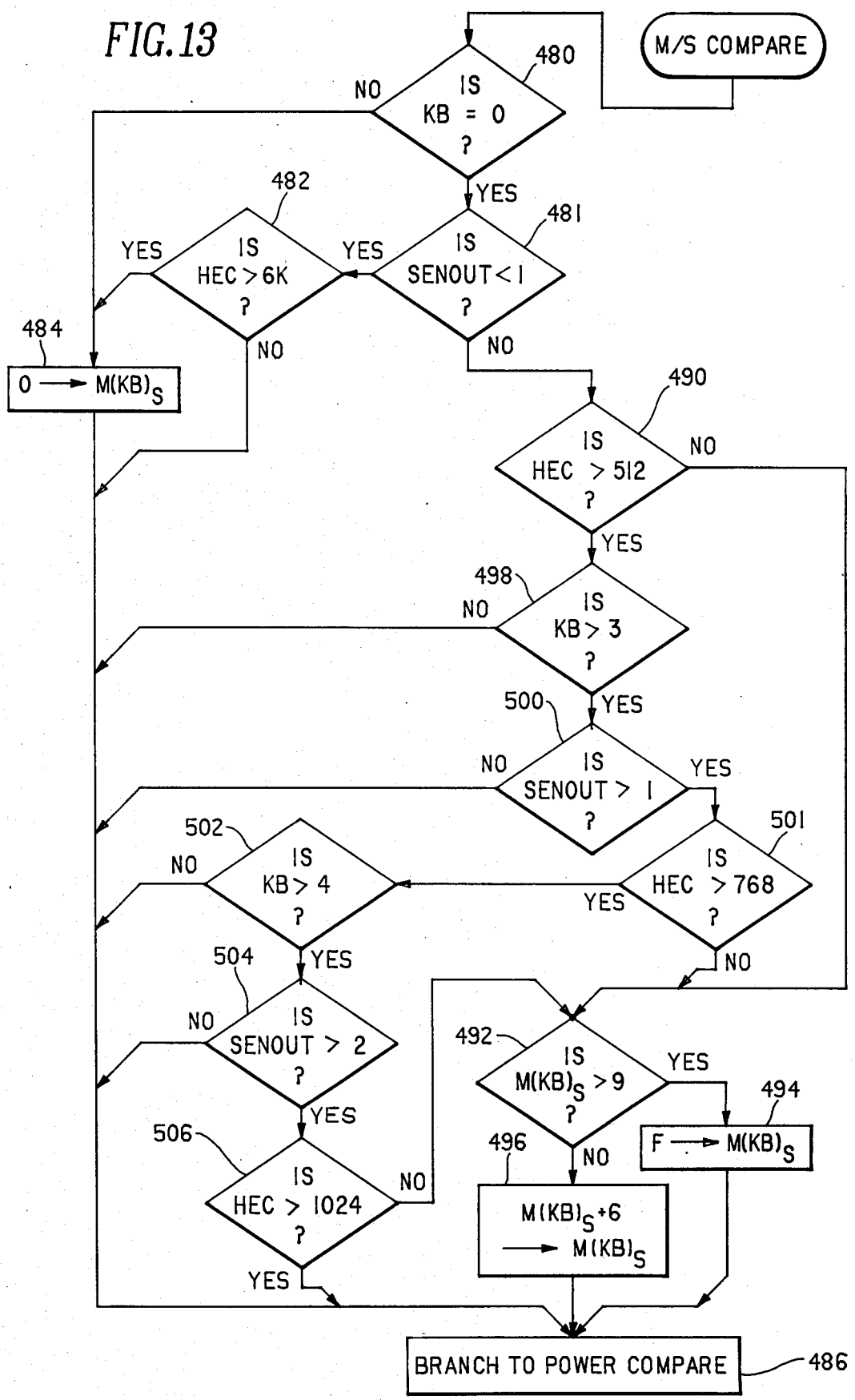
FIG. 13 is a flow diagram of the M/S COMPARE routine incorporated in the control program for the microprocessor in the circuit of FIG. 5.
Figure 14A:
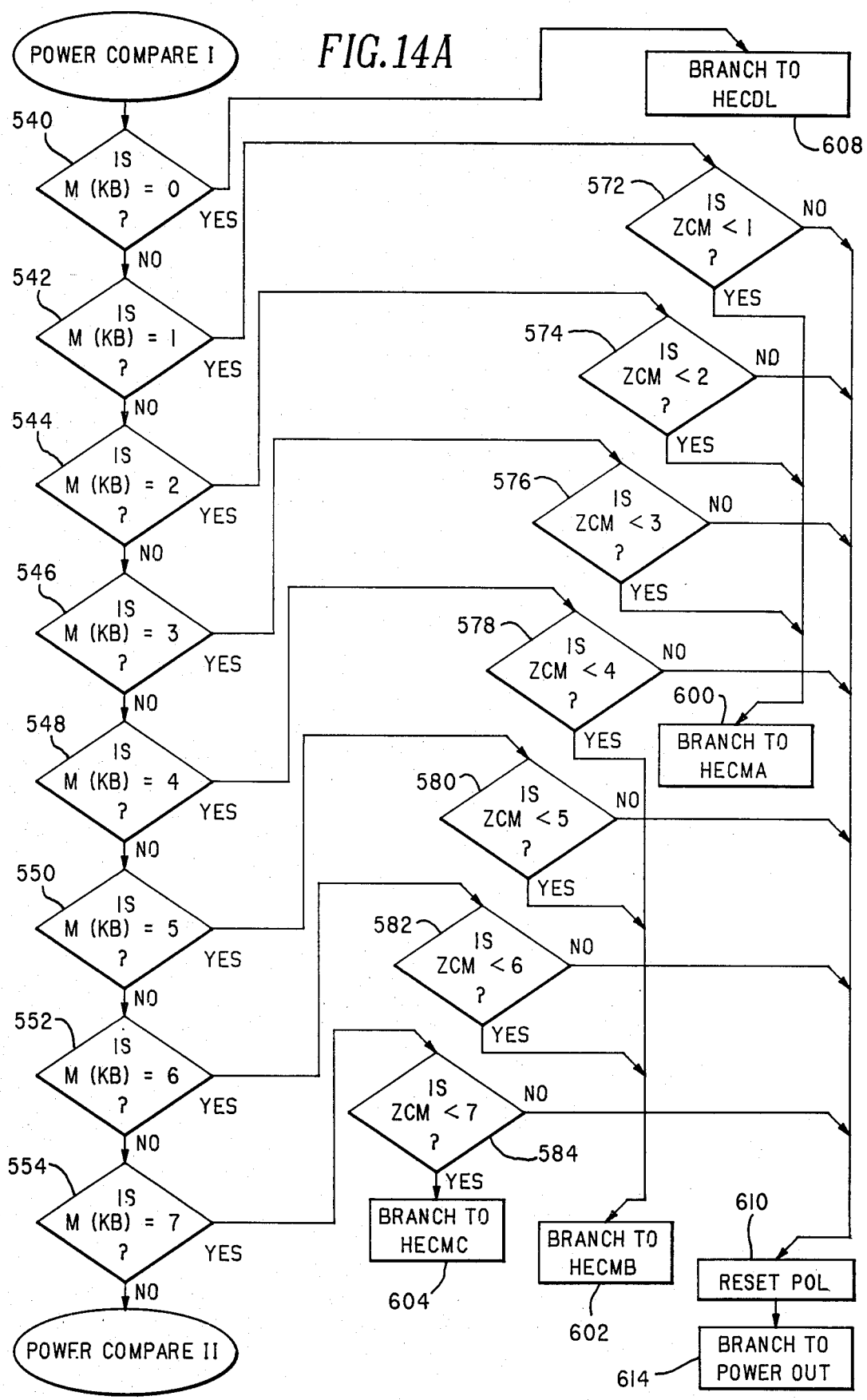
FIGS. 14A and 14B ar flow diagrams of the POWER COMPARE routine incorporated in the control program for the microprocessor in the circuit of FIG. 5.

M/S COMPARE Routine—FIG. 13

This routine is entered from the Griddle routine when operating in the Griddle mode. Its function is to adjust the power setting selected for slave surface unit 14 in the Griddle routine to compensate for uneven temperature conditions between the automatic surface unit (master unit) and the standard surface unit (slave unit). Specifically, its function is to adjust the power downward in the event the slave surface unit is hot relative to the sensed utensil temperature such as would occur when the slave surface unit had been previously in use as a single unit and had not had an opportunity to cool down while the automatic surface unit was beginning from room temperature; and to adjust power upward to overdrive the slave surface unit in the event the sensed utensil temperature indicates that the automatic surface unit is already preheated due to a prior use and the regular surface unit is relatively cool. Use is made of the sensed utensil temperature input for the master surface unit and the heater energy counter count for the slave surface unit to determine if operating conditions require such adjustments to be made.

Referring now to FIG. 13, Inquiry 480 determines if KB=0 signifying an OFF selection. If so, $M(KB)_S$ is set to zero (Block 484) and the program branches (Block 486) to the Power Compare routine (FIG. 14A). If not, Inquiry 481 determines if the sensed utensil temperature is less than 116° F. (SENOUT<1). If it is, signifying that the automatic surface unit is relatively cool, Inquiry 482 checks the count of the heater energy counter for the slave surface unit to determine if the count is greater than a predetermined reference count of 6K signifying a relatively hot slave surface unit. If the count is greater than 6K, $M(KB)_S$ is set to zero (Block 484) and the program branches (Block 486) to the Power Compare routine of FIG. 14 If the heater energy counter is not greater than 6K, no adjustment is made to $M(KB)_S$ and the program simply proceeds to the Power Compare routine.

Returning to Inquiry 481 if SENOUT is not less than 1, Inquiry 490 determines if the heater energy count is greater than a predetermined reference count of 512, representing a griddle temperature proximate element 14 greater than 103° F. If HEC is less than 512 signifying a relatively cool surface unit, then the power level for the slave surface unit is adjusted upwardly to be 6 levels higher than $M(KB)_M$ or 15, the maximum power level, whichever is less. This is accomplished by Inquiry 492 and Blocks 494 and 496. If HEC is not less than 512, Inquiry 498 determines if the selected temperature setting represented by KB is greater than 150° F. (KB>3). If not, no power level adjustment is necessary and the program branches (Block 486) to the Power Compare routine (FIG. 14A). If KB is greater than 3, Inquiry 500 determines if the sensed utensil temperature exceeds a second reference level of 140° F. (SENOUT>1). If not, no power level adjustment is necessary and the program branches (Block 486) to the Power Compare routine (FIG. 14A). If the sensed utensil temperature exceeds 140° F., then the heater energy count is compared at Inquiry 501 to a corresponding second reference count of 768 representing a griddle temperature of approximately 121° F. If HEC is not greater than 768, the program proceeds to Inquiry 492 to upwardly adjust the power level as hereinbefore described. If the count is greater than 768, indicating that the griddle temperature proximate element 14 is greater than 121° F., Inquiry 502 determines if the selected temperature setting is greater than 175° F. (KB>4). If not, no power level adjustment is necessary and the program branches (Block 486) to the Power Compare routine (FIG. 14A). If KB is greater than 4, Inquiry 504 determines if the sensed utensil temperature exceeds a reference temperature of 165° F. (SENOUT>2). If not, no adjustment is necessary and the program branches to the Power Compare routine. If the temperature exceeds 165° F., Inquiry 506 determines if the count of the heater energy counter exceeds a corresponding predetermined reference count of 1024 representing a griddle temperature approximately 140° F. If not, the program proceeds to Inquiry 492 to upwardly adjust the power level. If the count exceeds 1024, no power level adjustment is necessary and the program branches to the Power Compare routine.

It will be appreciated that the adjustment parameters selected for use in the Griddle and M/S Compare routines hereinbefore described have been empirically determined to provide satisfactory results for the illustrative Griddle embodiment. For Griddle arrangements using heating elements of different wattage ratings or a Griddle of a different construction, other parameters may provide better performance. Such parameters should be empirically determined which will provide the results desired for the particular griddle arrangement.

Figure 14B:
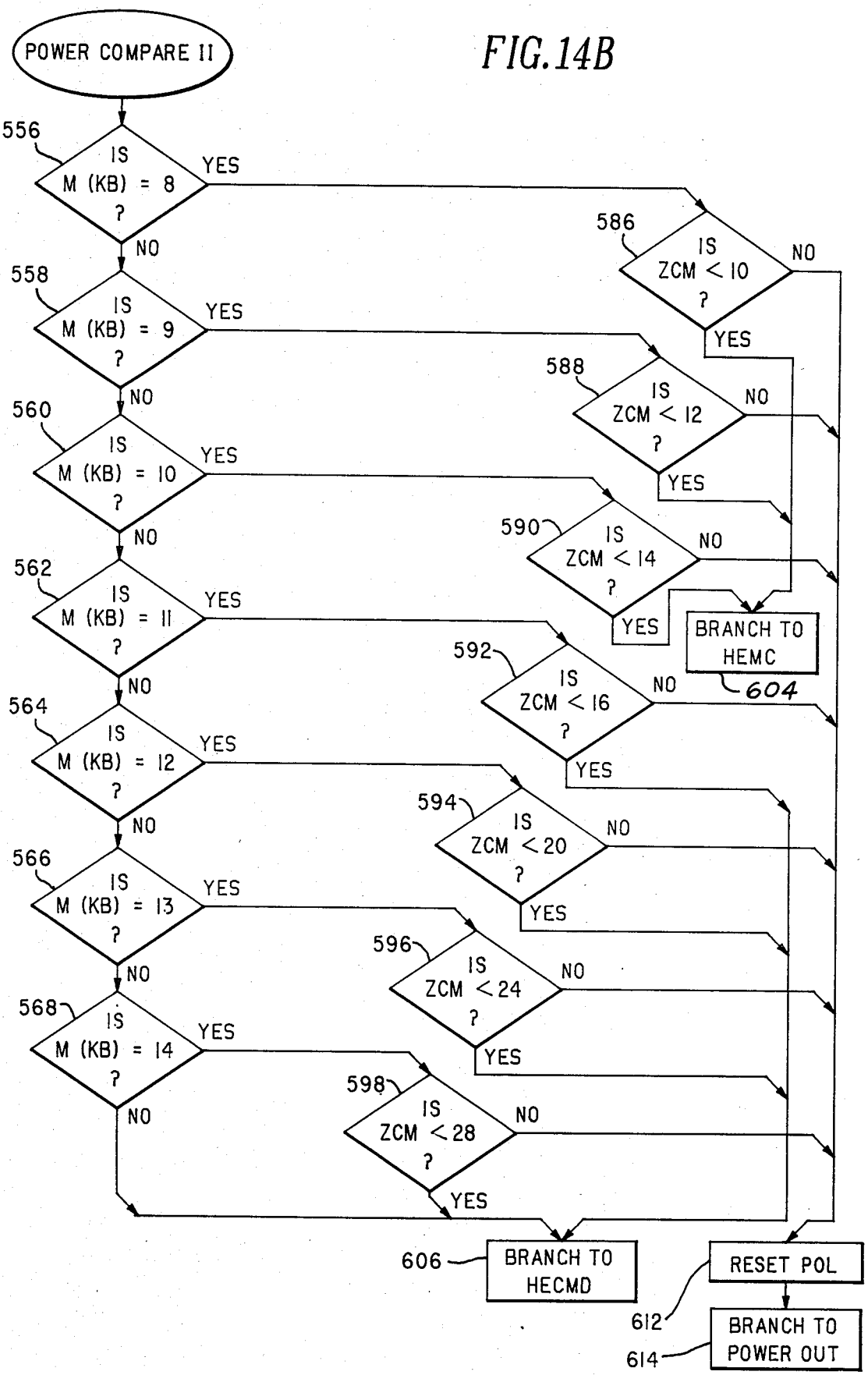

POWER COMPARE Routine—FIGS. 14A and 14B

The function of the Power Compare routine is to determine, based upon the power level designated by M(KB), whether or not the power control triac should be triggered into conduction for the next eight cycle control interval.

It will be recalled that there are 16 possible power levels including OFF. The % duty cycle for each power level corresponds to the ratio of conductive control intervals to 32, the total number of control intervals in the control period. A ZCM counter functioning as a 32 count ring counter is provided in each RAM file and is incremented once for each pass through the control program for that RAM file. The power control decision is made by comparing the ZCM count with a reference count associated with the power level represented by M(KB). The reference count for each power level represents the number of conductive control intervals per control period corresponding to the desired duty cycle. When the ZCM count is less than the reference, a Power Out Latch (POL) is set, signifying that the associated one of power control triacs 82A-D is to be switched into conduction; otherwise, POL is reset, signifying that the associated power control triac is to be non-conductive.

Referring to FIGS. 14A and B, Inquiries 540-568 determine the value of M(KB). The appropriate one of Inquiries 572-598 corresponding to the identified M(KB) performs the comparison of ZCM to the associated reference count. If ZCM is less than the reference signifying that the surface unit for which the control program is presently executing is to be energized during the next control interval, the program branches to the Heater Energy Compare routine, FIG. 16, entering the routine at entry point HECMA for M(KB)=1, 2 or 3 (Block 600), entry point HECMB for M(KB)=4–6 (Block 602), entry point HECMC for M(KB)=7–10 (Block 604) and entry point HECMD (Block 606) for M(KB)=11–15 to increment and decrement the counter at the appropriate rate and set the POL latch. If M(KB)=0 signifying an OFF selection, the program branches (Block 608) to entry point HECDL to decrement the counter.

If ZCM is not less than the reference, the Power Out Latch is reset by the appropriate one of Blocks 610 and 612, signifying that associated surface unit is to be de-energized during the next control interval and the program branches (Block 614) to the Power Out routine.

In the illustrative embodiment a heater energy counter is provided for each of the four surface units. However, only the heater energy counter for surface unit 14 is utilized in the griddle control arrangement of the present invention. If it is desired to delete heater energy counters for the other three surface units, simply change the instructions corresponding to Blocks 600, 602, 604, and 606 of FIGS. 14A and 14B in the RAM file for those elements to set the POL an then branch to the Power Out routine, and alter the Yes response to Inquiry 540 to direct the program to Block 610.

Figure 15:
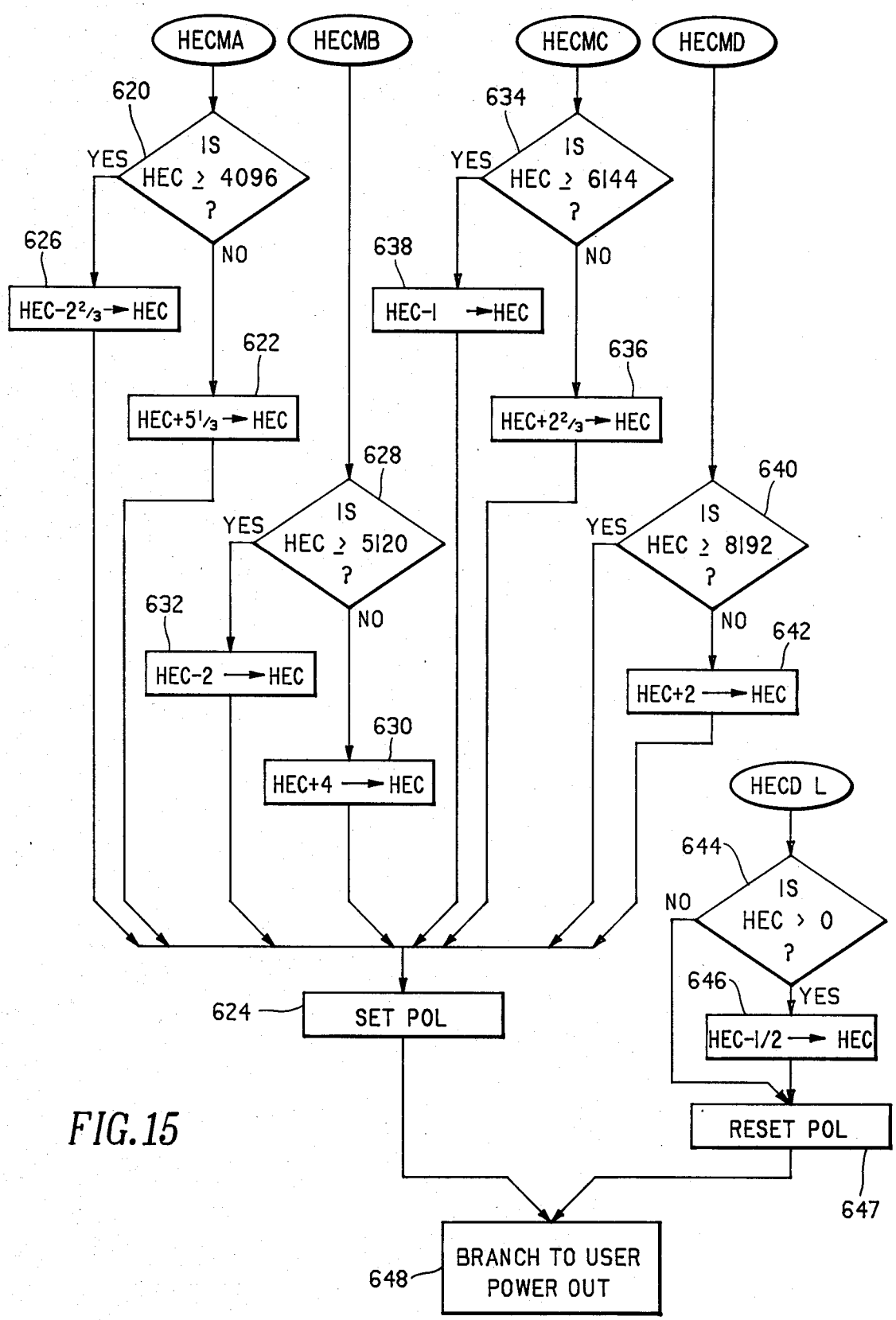
FIG. 15 is a flow diagram of the Heater Energy Compare routine incorporated in the control program of the microprocessor in the circuit of FIG. 5.

HEATER ENERGY COMPARE Routine—FIG. 15

The Heater Energy Compare Routine provides the counter control means for the heater energy counter. Its function is to increment the heater energy counter at the rate associated with the power level being applied to the heating element when the count is less than the maximum count for that selected level, discontinuing the incrementing of the heater energy counter when the maximum count for the applied level is reached and decrementing the heater energy counter when a change in applied power level from a relatively high setting to a relatively low setting (including OFF as the lowest setting) occurs, if the count of the heater energy counter is greater than the maximum count associated with the selected power level, and at a rate which approximates the rate of temperature decrease when the heating element cools down to the steady state temperature associated with the lower applied power setting from the operating temperature associated with the previously applied relatively higher power setting.

Figure 16:
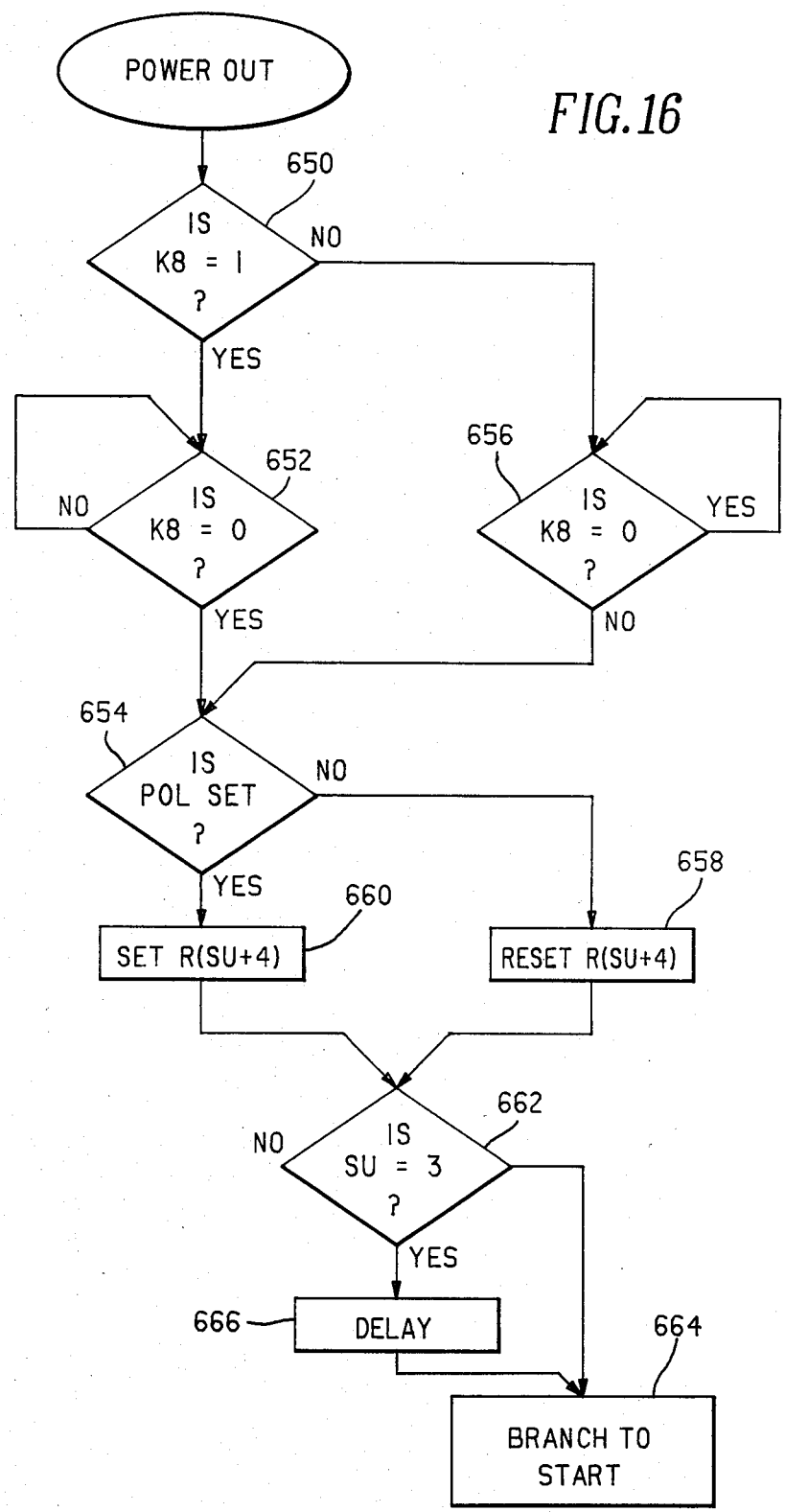
FIG. 16 is a flow diagram of the POWER OUT routine incorporated in the control program of the microprocessor in the circuit of FIG. 5.

It will be further recalled that for non-OFF power settings the heater energy counter is only incremented during control intervals immediately preceding those control intervals during which the heating element is to be energized. This same technique is employed for decrementing the heater energy counter for non-OFF power settings. Whe the heating element is to be energized during the next control interval as determined by the Power Compare routine hereinbefore described (FIGS. 14-16), the Heater Energy Compare routine of FIG. 16 is entered at one of points HECMA-HECMD, depending upon the selected power level. When entered at one of these points, the heater energy counter is either incremented or decremented the appropriate number of counts and the Power Out Latch (POL) is set. When the POL is set, a signal will be generated at R7 at the beginning of the next control interval for element 12 to trigger triac 82(A) into conduction for the duration of that control interval.

If one of power levels 1-4 has been selected, this routine is entered at entry point HECMA. Inquiry 620 determines whether the heater energy counter has reached the maximum count for thse four settings of 4096. If the count is less than this maximum count indicating that the heating element is still heating up, the heater energy counter is incremented 5⅓ counts (Block 622) and the Power On Latch (POL) is set (Block 624). This increments the HEC at rates of 16, 21⅓, 37⅓, and 53⅓ counts per control period for power settings 1-4, respectively. Setting of POL (Block 624) will close the heater control relay at the beginning of the next control interval.

If the maximum count for settings 1-4 has been exceeded, this signifies that the heating element had been previously operating at a power setting higher than power setting 4, with a corresponding higher temperature, and that the heater energy counter has not yet been decremented to the lower maximum count associated with power settings 1-4, which in turn signifies that the heating element is in the cool-down phase between its previous higher temperature and the lower temperature associated with the lower power setting. The heater energy counter is thus decremented by 2⅔ counts (Block 626), and the Power Out Latch is set (Block 624). This decrements the HEC at rates of 8, 10⅔, 18⅔, and 26⅔ counts per control period for power settings 1-4, respectively.

If the heating element is presently being operated at one of levels 5-7, this routine is entered at HECMB. Inquiry 628 determines if the maximum count associated with these levels of 5120 has been reached. If not, HEC is incremented by 4 counts (Block 630) and POL is set (Block 624). This increments the HEC at the rate of 56, 72 and 104 counts per control period for settings 5, 6 and 7, respectively. If the HEC count exceeds the maximum count, again indicating heating element operation in the cool-down phase following a change from a higher power setting, the HEC is decremented by 2 counts (Block 632) and the POL is set (Block 624). This decrements the HEC at an effective average rate of 28, 36, and 52 counts per control period for settings 5, 6 and 7, respectively.

If the heating element is operating at one of levels 8-10, this routine is entered at point HECMC. Inquiry 634 determines if the maximum count associated with these levels of 6144 has been reached. If not, the HEC is incremented by 2⅔ counts (Block 636) and the POL is set (Block 624). This increments the HEC at an effective average rate of 88, 112, and 141⅓ counts per control period for levels 8, 9 and 10, respectively. If the HEC count exceeds the maximum count, signifying operation in the cool-down phase following a change from a higher power setting, the HEC is decremented by 1 count (Block 638) and the POL is set (Block 624). This decrements the HEC at an effective rate of 33, 42 and 53 counts per control period for power settings 8, 9 and 10, respectively.

If the heating element is being operated at one of power levels 11-15, this routine is entered at entry point HECMD. Inquiry 640 determines whether the maximum count for these power levels of 8192 has been reached. If not, the HEC is incremented by 2 (Block 642) and the POL is set (Block 624). This increments the HEC at an effective rate of 128, 160, 192, 224 and 256 counts per control period for levels 11, 12, 13, 14 and 15, respectively. Since there are no conditions under which selection of one of these power levels requires decrementing of the HEC, if the maximum count has been reached, Block 642 is bypassed, leaving the count of the HEC unchanged and POL is set (Block 624).

If the OFF power setting is being implemented, this routine is entered at entry point HECDL and Inquiry 644 determines whether the count of HEC is zero. If not, the count is decremented by ½ count (Block 646). This decrements the HEC at a rate of 64 counts per control period. The POL latch is then reset (Block 647). Having incremented or decremented the heater energy counter and set or reset the POL latch as appropriate, the program branches (Block 648) to the Power Out routine (FIG. 16).

POWER OUT Routine—FIG. 16

It will be recalled from the description of the Start routine (FIG. 6) that the control program is executed for each surface unit sequentially. The variable SU is the indexing variable used to control the sequencing. SU=0,1,2 and 3 identifies which of RAM file and corresponding surface units 14, 16, 18 and 12 respectively is the subject of the current pass through the program.

The function of the Power Out routine is to synchronize the firing of that one of power control triacs 82A-D associated with the surface unit for which the control program is then executing with zero crossings of the 60 Hz AC power signal applied across L1 and L2 (FIG. 5).

Referring now to FIG. 16, input port K8 receives zero crossing pulses from zero crossing detector circuit 100 (FIG. 5). Positive half-cycles are represented by K8=1 and negative half-cycles by K8=0. Inquiry 650 determines the polarity of the present power signal half-cycle. If the signal is presently in a positive half-cycle, (K8=1), Inquiry 652 waits for the beginning of the next negative half-cycle, (K8=0). Upon detection of KB=1, the program proceeds to Inquiry 654. If the answer to Inquiry 650 is NO (K8=0), Inquiry 656 waits for the beginning of the next positive half-cycle (K8=1), then proceeds to Inquiry 654.

Inquiry 654 checks the state of the Power Out Latch (POL). If POL is reset, signifying that the corresponding surface unit is not to be energized during the next control interval, the appropriate output port identified by the index variable SU+4 (R(SU+4) identifies R4, R5, R6 and R7 for SU=0, 1, 2 and 3 respectively) is reset (Block 658); if POL is set, signifying that the corresponding surface unit is to be energized, R(SU+4) is set (Block 660).

Inquiry 662 causes the control program to branch (Block 664) directly to the Start routine to repeat the program for the next surface unit until SU equals 3 signifying that execution has been completed for all four surface units. When SU equals 3, the program delays until the beginning of the next control interval. In the illustrative embodiment, execution of the control program uses one-half cycle of the power signal for each pass. Thus, execution for all four units is completed in the first two cycles of the power signal. The duration of the control interval is eight cycles. For SU equal to three Block 666 delays the program for six cycles after which the program branches (Block 664) to Start to begin execution for the next control interval.

While in accordance with the Patent Statutes, a specific embodiment of the present invention has been illustrated and described herein, it is realized that numerous modifications and changes will occur to those skilled in the art. For example, in the illustrative embodiment a griddle is uniformly heated by the automatic surface unit and one of the standard surface units. However, the power control arrangement of the invention could be similarly employed with other large utensils intended to be simultaneously heated by both elements. It is therefore to be understood that the appended claims are intended to cove all such modifications and changes as fall within the true spirit and scope of the invention.

What is claimed is:

1. A power control arrangement for a cooking appliance of the type having at least two surface units adapted for energization by an external electrical power supply, which surface units are selectively operable in a normal mode and a dual mode in which a utensil is supported on and extends over the first and second surface units for heating by both units, a first one of the surface units having a higher wattage rating than the second one of the surface units, said power control arrangement comprising:
   temperature sensing means for sensing the temperature of a utensil supported on one of the first or second surface units;
   user operable input selection means including means for selecting the desired steady state temperature range for said one of the surface units, means for selecting the desired heat setting for the other surface unit, and means for selecting the dual operating mode; and
   electronic power control means for controlling energization of the surface units, effective in the normal mode to operate said one surface unit at a power level established as a function of the selected temperature range and the sensed utensil temperature and to independently operate said other surface unit at a power level corresponding to the selected heat setting, and effective in response to selection of the dual operating mode to operate said one surface unit at a power level established as a function of the selected temperature and the sensed utensil temperature and to operate said other surface unit at a power level established as a function of the power level applied to said one surface unit to compensate for the characteristic wattage difference between said surface units whereby the effective heating level of both surface units is controlled as a function of the sensed utensil temperature and the heating level of said first surface unit is approximately equal to the effective heating level of said second surface unit resulting in relatively even heating of the utensil.

2. The power control arrangement of claim 1 wherein said temperature sensing means is associated with the first surface unit and wherein the power level applied to the second surface unit in the dual mode is proportionally higher than the power level applied to the first surface unit to compensate for the higher wattage characteristic of the first surface unit.

3. A power control arrangement for a cooking appliance of the type having at least two surface units adapted for energization by an external electrical power supply which surface units are selectively operable in a normal mode and a dual mode in which a utensil is supported on and extends over both surface units for heating by both surface units, said power control arrangement comprising:
   temperature sensing means for sensing the temperature of a utensil supported on a first one of the surface units;
   user operable input selection means including means for selecting a desired temperature setting for the first surface unit, means for selecting the desired heat setting for the second one of the surface units, and means for selecting the dual mode;
   energy counter means for approximately tracking the temperature of the utensil proximate the second surface unit;
   counter control means for incrementing and decrementing said energy counter means at rates proportional to the rates of increase and decrease respectively of the surface unit temperature for the level of energization of the second surface unit; and
   power control means operative in the noraal mode to operate the said first surface unit at a power level established as a function of the user selected temperature setting and the sensed utensil temperature, and to operate said second surface unit independently of the first surface unit at a power level selected as a function of the user selected heat setting for the second surface unit;

said power control means being further operative in response to selection of the dual mode to operate the second surface unit at a power level established as a function of the power level applied to the first surface unit, said selected temperature setting, said sensed utensil temperature and the count of said heater energy counter, to rapidly bring the heating level of both surface units to approximately the same level.

4. The power control arrangement of claim 3 wherein the first surface unit has a higher wattage rating than the second surface unit and wherein said power control means is operative to apply a power level to the second surface unit which is established as a proportionally higher power level than that applied to said first surface unit to compensate for the wattage rating difference between the two surface units.

5. The power control arrangement of claim 3 wherein said power control means is operative in the dual mode to de-energize the second surface unit when the sensed utensil temperature signifies that the first surface unit is relatively cool and said count of said energy counter means signifies that the second surface unit is relatively hot; and to operate the second unit at a power level higher than the normal power level for the selected temperature when the sensed utensil temperature signifies that the first surface unit is relatively hot and the count of said energy counter means signifies that the second surface unit is relatively cool, whereby the heat levels of the first and second surface units are rapidly approximately equalized resulting in a relatively even temperature distribution for the utensil.

6. The power control arrangement of claim 3 wherein said power control means includes means operative in the dual mode for comparing the sensed utensil temperature to a reference temperature representative of a relatively cool first surface unit, for comparing the heater energy count to a reference count representing a relatively hot second surface unit, and for de-energizing the second surface unit when said sensed utensil temperature is less than said reference temperature and said heater energy count is greater than said reference count thereby de-energizing the second surface unit when it is hot relative to the first surface unit so as to rapidly bring the heat levels of said first and second surface units to approximately equal levels for relatively even temperature distribution for the utensil.

7. The power control arrangement of claim 3 wherein said power control means includes means operative in the dual mode for comparing the sensed utensil temperature to a reference temperature representative of a relatively hot first surface unit and means for comparing the heater energy count to a relatively low reference value representative of a relatively cool second surface unit, and for operating said second surface unit at a power level higher than the normal power level for the selected temperature when the sensed utensil temperature is greater than said reference temperature and the heater energy count is less than said low reference count, thereby overdriving the second surface unit when the second surface unit is relatively cool and the first surface unit is relatively hot to rapidly bring the heat levels of both units to an approximately equal level to provide a relatively uniform temperature distribution for the utensil.

8. The power control arrangement of claim 6 wherein said power control means further includes means operative in the dual mode for comparing the heater energy count to a relatively low reference count corresponding to a relatively cool second surface unit, and for operating said second surface unit at a power level higher than the normal power level for the selected temperature when the sensed utensil temperature is greater than said reference temperature and the heater energy count is less than said low reference count, thereby overdriving the second surface unit when the second surface unit is relatively cool and the first surface unit is relatively hot to rapidly bring the heat levels of both units to an approximately equal level to provide a relatively uniform temperature distribution for the utensil.

9. In a cooking appliance of the type having at least two surface heating units adapted for selective energization at one of a plurality of power levels, which surface units are operable in a normal mode and a dual mode in which a utensil extends over both surface units for heating, a first one of the surface units being equipped with temperature sensing means for directly sensing the temperature of utensils being heated thereon and the second on of the surface units being provided with a heater energy counter which is incremented and decremented according to the level of energization of the second surface unit such that the count of the counter approximately tracks the temperature of the utensil proximate the second surface unit when operating in the dual mode, a method of controlling the energization of the surface units to achieve approximately even heating of the utensil in the dual mode comprising the steps of:

at least periodically sampling the sensed utensil temperature measured by the temperature sensing means;

operating the first surface unit at a power level established as a function of the sensed utensil temperature and the user selected temperature setting., comparing the sensed utensil temperature to a first relatively low predetermined reference temperature;

if the sensed utensil temperature is less than the first reference temperature, signifying a relatively cool first surface unit then comparing the count of the heater energy counter to a first reference count representative of a relatively high temperature condition for the second surface unit, if the count is greater than the reference, de-energizing the second surface unit until the count is less than the reference.

10. In a cooking appliance of the type having at least two surface heating units adapted for selective energization at one of a plurality of power levels which surface units are operable in a dual mode, and including a utensil adapted to extend over and be supported upon both surface units for operation in the dual mode, a first one of the surface units being equipped with temperature sensing means for directly sensing the temperature of utensils being heated thereon and the second one of the surface units being provided with a heater energy counter which is incremented and decremented according to the level of energization of the second surface unit such that the count approximately tracks the temperature of the utensil proximate the second surface unit when operating in the dual mode, a method of controlling the energization of the surface units to achieve approxinately even heating of the utensil comprising the steps of:

at least periodically sampling the sensed utensil temperature measured by the temperature sensing means;

operating the first surface unit at a power level established as a function of the sensed utensil temperature and the user selected temperature setting;

operating the second surface unit at a normal power level established as a function of the power level applied to the first surface unit;

comparing the sensed utensil temperature to a first relatively low predetermined reference temperature;

if the sensed utensil temperature is greater than the first reference temperature, comparing the count of the heater energy counter to a first reference count representative of a utensil temperature proximate the second surface unit associated with the first reference temperature;

if the count is less than the reference count, operating the second surface unit at a transient power level higher than the normal level for the second surface unit until the count is greater than the first reference count.

11. The power control method of claim 10 further comprising the steps of:

if the count is greater than the first reference count and the user selected temperature setting is greater than a predetermined relatively low setting, comparing the sensed utensil temperature to a second relatively higher reference temperature value;

if the sensed utensil temperature is greater than the second reference value, comparing the count of the heater energy counter to a second relatively higher reference count;

if the count is less than the second reference count, operating the second surface unit at the transient power level until the count exceeds the second reference count.

12. The power control method of claim 11 further comprising the steps of:

if the count is greater than the second reference count and the user selected temperature setting is greater than a second temperature setting relatively higher than the first reference setting, comparing the sensed utensil temperature to a third reference temperature relatively higher than the second reference temperature;

if the sensed utensil temperature is greater than the third reference value, comparing the count of the heater energy counter to a third reference count relatively higher than the second reference count;

if the count is less than the third reference count, operating the third surface unit at the transient power level until the count exceeds the third reference count.

* * * * *

UNITED STATES PATENT AND TRADEMARK OFFICE
CERTIFICATE OF CORRECTION

PATENT NO. : 4,634,843
DATED : January 6, 1987
INVENTOR(S) : Thomas R. Payne

It is certified that error appears in the above-identified patent and that said Letters Patent is hereby corrected as shown below:

Column 30, line 68, "noraal" should read --normal--.
Column 32, line 27, "on" should read --one--.

Signed and Sealed this

Seventh Day of April, 1987

Attest:

DONALD J. QUIGG

Attesting Officer

Commissioner of Patents and Trademarks